(12) United States Patent
Bazzarella et al.

(10) Patent No.: US 10,566,581 B2
(45) Date of Patent: Feb. 18, 2020

(54) ELECTROCHEMICAL CELLS AND METHODS OF MANUFACTURING THE SAME

(71) Applicant: 24M Technologies, Inc., Cambridge, MA (US)

(72) Inventors: Ricardo Bazzarella, Woburn, MA (US); Alexander H. Slocum, Bow, NH (US); Tristan Doherty, Somerville, MA (US); James C. Cross, III, Carlisle, MA (US)

(73) Assignee: 24M Technologies, Inc., Cambridge, MA (US)

( * ) Notice: Subject to any disclaimer, the term of this patent is extended or adjusted under 35 U.S.C. 154(b) by 0 days.

(21) Appl. No.: 15/724,701

(22) Filed: Oct. 4, 2017

(65) Prior Publication Data

US 2018/0233708 A1 Aug. 16, 2018

Related U.S. Application Data

(63) Continuation of application No. 15/188,374, filed on Jun. 21, 2016, now Pat. No. 9,812,674, which is a
(Continued)

(51) Int. Cl.
*H01M 10/052* (2010.01)
*H01M 2/02* (2006.01)
(Continued)

(52) U.S. Cl.
CPC .......... *H01M 2/021* (2013.01); *H01M 2/027* (2013.01); *H01M 2/0287* (2013.01);
(Continued)

(58) Field of Classification Search
CPC .................. H01M 10/052; H01M 10/0525
See application file for complete search history.

(56) References Cited

U.S. PATENT DOCUMENTS

| 2,208,028 A | 7/1940 | Harrington |
| 3,624,628 A | 11/1971 | Schmidt |

(Continued)

FOREIGN PATENT DOCUMENTS

| CN | 1333929 A | 1/2002 |
| CN | 1354529 | 6/2002 |

(Continued)

OTHER PUBLICATIONS

Office Action for U.S. Appl. No. 14/926,760, dated Jun. 27, 2018, 10 pages.
(Continued)

*Primary Examiner* — Olatunji A Godo
(74) *Attorney, Agent, or Firm* — Cooley LLP

(57) ABSTRACT

Electrochemical cells and methods of making electrochemical cells are described herein. In some embodiments, an apparatus includes a multi-layer sheet for encasing an electrode material for an electrochemical cell. The multi-layer sheet including an outer layer, an intermediate layer that includes a conductive substrate, and an inner layer disposed on a portion of the conductive substrate. The intermediate layer is disposed between the outer layer and the inner layer. The inner layer defines an opening through which a conductive region of the intermediate layer is exposed such that the electrode material can be electrically connected to the conductive region. Thus, the intermediate layer can serve as a current collector for the electrochemical cell.

24 Claims, 15 Drawing Sheets

Related U.S. Application Data continuation of application No. 14/543,489, filed on Nov. 17, 2014, now Pat. No. 9,401,501, which is a continuation of application No. PCT/US2013/041537, filed on May 17, 2013, which is a continuation-in-part of application No. 13/832,836, filed on Mar. 15, 2013, now Pat. No. 9,178,200.

(60) Provisional application No. 61/648,967, filed on May 18, 2012.

(51) Int. Cl.
*H01M 10/04* (2006.01)
*H01M 10/0525* (2010.01)

(52) U.S. Cl.
CPC ... *H01M 10/0404* (2013.01); *H01M 10/0413* (2013.01); *H01M 10/0436* (2013.01); *H01M 10/0525* (2013.01); *H01M 2/0207* (2013.01); *H01M 2220/30* (2013.01)

(56) References Cited

U.S. PATENT DOCUMENTS

| | | |
|---|---|---|
| 4,080,728 A | 3/1978 | Buckler |
| 4,105,815 A | 8/1978 | Buckler |
| 4,199,912 A | 4/1980 | James, Jr. et al. |
| 4,386,019 A | 5/1983 | Kann et al. |
| 4,695,355 A | 9/1987 | Koziol |
| 4,818,643 A | 4/1989 | Cook et al. |
| 4,925,752 A | 5/1990 | Fauteux et al. |
| 5,316,556 A | 5/1994 | Morris |
| 5,582,931 A | 12/1996 | Kawakami |
| 5,603,770 A | 2/1997 | Sato |
| 5,612,152 A | 3/1997 | Bates |
| 5,674,556 A | 10/1997 | Fukumura et al. |
| 5,697,145 A | 12/1997 | Fukumura et al. |
| 5,725,822 A | 3/1998 | Keller et al. |
| 5,749,927 A | 5/1998 | Chern et al. |
| 5,792,576 A | 8/1998 | Xing et al. |
| 5,834,052 A | 11/1998 | Fukumura et al. |
| 5,837,397 A | 11/1998 | Xing |
| 6,207,322 B1 | 3/2001 | Kelsey et al. |
| 6,264,707 B1 | 7/2001 | Ishikawa et al. |
| 6,284,192 B1 | 9/2001 | Coonan et al. |
| 6,287,722 B1 | 9/2001 | Barton et al. |
| 6,291,091 B1 | 9/2001 | Preischl et al. |
| 6,368,365 B1 | 4/2002 | Chi et al. |
| 6,403,262 B1 | 6/2002 | Xing et al. |
| 6,461,757 B1 | 10/2002 | Sasayama et al. |
| 6,503,432 B1 | 1/2003 | Barton et al. |
| 6,503,657 B1 | 1/2003 | Takami et al. |
| 6,576,365 B1 | 6/2003 | Meitav et al. |
| 6,589,299 B2 | 7/2003 | Missling et al. |
| 6,939,383 B2 | 9/2005 | Eastin et al. |
| 6,986,967 B2 | 1/2006 | Barton et al. |
| 7,022,391 B2 | 4/2006 | Kawai et al. |
| 7,041,380 B2 | 5/2006 | Yamashita et al. |
| 7,338,734 B2 | 3/2008 | Chiang et al. |
| 7,524,577 B2 | 4/2009 | Bates |
| 7,700,019 B2 | 4/2010 | Lavoie et al. |
| 7,846,575 B2 | 12/2010 | Heller, Jr. et al. |
| 8,722,226 B2 | 5/2014 | Chiang et al. |
| 8,722,227 B2 | 5/2014 | Chiang et al. |
| 8,778,552 B2 | 7/2014 | Chiang et al. |
| 8,993,159 B2 | 3/2015 | Chiang et al. |
| 9,153,833 B2 | 10/2015 | Chiang et al. |
| 9,178,200 B2 | 11/2015 | Bazzarella et al. |
| 9,184,464 B2 | 11/2015 | Chiang et al. |
| 9,203,092 B2 | 12/2015 | Slocum et al. |
| 9,293,781 B2 | 3/2016 | Chiang et al. |
| 9,362,583 B2 | 6/2016 | Chiang et al. |
| 9,385,392 B2 | 7/2016 | Chiang et al. |
| 9,401,501 B2 | 7/2016 | Bazzarella et al. |
| 9,437,864 B2 | 9/2016 | Tan et al. |
| 9,484,569 B2 | 11/2016 | Doherty et al. |
| 9,583,780 B2 | 2/2017 | Chiang et al. |
| 9,614,231 B2 | 4/2017 | Carter et al. |
| 9,786,944 B2 | 10/2017 | Chiang et al. |
| 9,812,674 B2 | 11/2017 | Bazzarella et al. |
| 9,825,280 B2 | 11/2017 | Chiang et al. |
| 9,831,518 B2 | 11/2017 | Chiang et al. |
| 9,831,519 B2 | 11/2017 | Chiang et al. |
| 9,831,522 B2 | 11/2017 | Tan et al. |
| 10,115,970 B2 | 10/2018 | Ota et al. |
| 10,122,044 B2 | 11/2018 | Tan et al. |
| 10,153,651 B2 | 12/2018 | Taylor et al. |
| 10,181,587 B2 | 1/2019 | Ota et al. |
| 10,230,128 B2 | 3/2019 | Chiang et al. |
| 10,236,518 B2 | 3/2019 | Chiang et al. |
| 2001/0012588 A1 | 8/2001 | Kaido et al. |
| 2001/0021471 A1 | 9/2001 | Xing et al. |
| 2002/0106561 A1 | 8/2002 | Lee et al. |
| 2003/0116881 A1 | 6/2003 | Nelson et al. |
| 2004/0029001 A1 | 2/2004 | Yamazaki et al. |
| 2004/0029008 A1 | 2/2004 | Winterberg et al. |
| 2004/0029311 A1 | 2/2004 | Snyder et al. |
| 2005/0064270 A1 | 3/2005 | Marionowski |
| 2005/0214648 A1 | 9/2005 | Boulton et al. |
| 2006/0046137 A1 | 3/2006 | Kodama |
| 2006/0057433 A1 | 3/2006 | Ando et al. |
| 2007/0034251 A1 | 2/2007 | Jonczyk et al. |
| 2008/0096110 A1 | 4/2008 | Bito et al. |
| 2008/0289676 A1 | 11/2008 | Guidotti et al. |
| 2009/0023041 A1 | 1/2009 | Cooper |
| 2009/0029259 A1 | 1/2009 | Okazaki et al. |
| 2010/0040942 A1 | 2/2010 | Hatta et al. |
| 2010/0047671 A1 | 2/2010 | Chiang et al. |
| 2010/0112454 A1 | 5/2010 | Visco et al. |
| 2010/0196800 A1 | 8/2010 | Markoski et al. |
| 2010/0323264 A1 | 12/2010 | Chiang et al. |
| 2011/0086258 A1 | 4/2011 | Yaginuma et al. |
| 2011/0104527 A1 | 5/2011 | Choi et al. |
| 2011/0189520 A1 | 8/2011 | Carter et al. |
| 2011/0200848 A1 | 8/2011 | Chiang et al. |
| 2011/0274948 A1 | 11/2011 | Duduta et al. |
| 2011/0287314 A1 | 11/2011 | Jung |
| 2011/0311857 A1 | 12/2011 | Tucholski |
| 2012/0003547 A1 | 1/2012 | Raj |
| 2012/0058378 A1 | 3/2012 | Lee et al. |
| 2012/0070715 A1* | 3/2012 | Obika ............ H01M 4/13 429/152 |
| 2012/0164499 A1 | 6/2012 | Chiang et al. |
| 2013/0000110 A1 | 1/2013 | Takeda et al. |
| 2013/0055559 A1 | 3/2013 | Slocum et al. |
| 2013/0065122 A1 | 3/2013 | Chiang et al. |
| 2013/0309547 A1 | 11/2013 | Bazzarella et al. |
| 2013/0337319 A1 | 12/2013 | Doherty et al. |
| 2014/0004437 A1 | 1/2014 | Slocum et al. |
| 2014/0008006 A1 | 1/2014 | Lee et al. |
| 2014/0030623 A1 | 1/2014 | Chiang et al. |
| 2014/0039710 A1 | 2/2014 | Carter et al. |
| 2014/0131630 A1 | 5/2014 | Hwang et al. |
| 2014/0154546 A1 | 6/2014 | Carter et al. |
| 2014/0154565 A1 | 6/2014 | Ku et al. |
| 2014/0170524 A1 | 6/2014 | Chiang et al. |
| 2014/0248521 A1 | 9/2014 | Chiang et al. |
| 2014/0272547 A1 | 9/2014 | Ramasubramanian et al. |
| 2014/0315097 A1 | 10/2014 | Tan et al. |
| 2014/0356736 A1 | 12/2014 | Choi et al. |
| 2014/0363721 A1 | 12/2014 | Bhola et al. |
| 2015/0024279 A1 | 1/2015 | Tan et al. |
| 2015/0027615 A1 | 1/2015 | Singh et al. |
| 2015/0129081 A1 | 5/2015 | Chiang et al. |
| 2015/0140371 A1 | 5/2015 | Slocum et al. |
| 2015/0155596 A1 | 6/2015 | Gardner |
| 2015/0171406 A1 | 6/2015 | Bazzarella et al. |
| 2015/0280267 A1 | 10/2015 | Chiang et al. |
| 2015/0295272 A1 | 10/2015 | Chiang et al. |
| 2015/0357626 A1 | 12/2015 | Holman et al. |
| 2016/0013507 A1 | 1/2016 | Chiang et al. |
| 2016/0056490 A1 | 2/2016 | Chiang et al. |
| 2016/0056491 A1 | 2/2016 | Chiang et al. |
| 2016/0105042 A1 | 4/2016 | Taylor et al. |

(56) References Cited

U.S. PATENT DOCUMENTS

| | | |
|---|---|---|
| 2016/0126543 A1 | 5/2016 | Ota et al. |
| 2016/0133916 A1 | 5/2016 | Zagars et al. |
| 2016/0190544 A1 | 6/2016 | Slocum et al. |
| 2016/0218375 A1 | 7/2016 | Chiang et al. |
| 2016/0268621 A1 | 9/2016 | Chiang et al. |
| 2016/0301038 A1 | 10/2016 | Modest et al. |
| 2016/0308218 A1 | 10/2016 | Ota et al. |
| 2016/0344006 A1 | 11/2016 | Ota et al. |
| 2016/0372802 A1 | 12/2016 | Chiang et al. |
| 2017/0018798 A1 | 1/2017 | Tan et al. |
| 2017/0025646 A1 | 1/2017 | Ota et al. |
| 2017/0025674 A1 | 1/2017 | Tan et al. |
| 2017/0033389 A1 | 2/2017 | Chiang et al. |
| 2017/0033390 A1 | 2/2017 | Chiang et al. |
| 2017/0077464 A1 | 3/2017 | Bazzarella et al. |
| 2017/0162863 A1 | 6/2017 | Doherty et al. |
| 2017/0214034 A1 | 7/2017 | Ota et al. |
| 2017/0237111 A1 | 8/2017 | Holman et al. |
| 2017/0237112 A1 | 8/2017 | Hol |
| 2017/0288281 A1 | 10/2017 | Chiang et al. |
| 2018/0034090 A1 | 2/2018 | Chiang et al. |
| 2018/0175428 A1 | 6/2018 | Chiang et al. |
| 2018/0175445 A1 | 6/2018 | Tan et al. |
| 2018/0233722 A1 | 8/2018 | Holman et al. |
| 2018/0287220 A1 | 10/2018 | Woodford et al. |
| 2019/0036101 A1 | 1/2019 | Tyler et al. |
| 2019/0058184 A1 | 2/2019 | Bazzarella et al. |

FOREIGN PATENT DOCUMENTS

| | | |
|---|---|---|
| CN | 101212070 | 7/2008 |
| CN | 102983369 A | 3/2013 |
| CN | 104040764 A | 9/2014 |
| EP | 0602976 A1 | 6/1994 |
| JP | S62-008932 B2 | 2/1987 |
| JP | H11-111265 | 4/1999 |
| JP | 2003-532277 T | 10/2003 |
| JP | 2003-317731 A | 11/2003 |
| JP | 2005-056729 A | 3/2005 |
| JP | 2006-172766 A | 6/2006 |
| JP | 2006-172773 A | 6/2006 |
| JP | 2006-269288 A | 10/2006 |
| JP | 2007-115678 A | 5/2007 |
| JP | 2007-335283 | 12/2007 |
| JP | 2009-176513 A | 8/2009 |
| JP | 2010-062008 | 3/2010 |
| JP | 2010-245000 A | 10/2010 |
| JP | 2011-077269 | 4/2011 |
| WO | WO 2001/041232 | 7/2001 |
| WO | WO 2010/118060 | 10/2010 |
| WO | WO 2010/137415 | 12/2010 |
| WO | WO2010150077 | * 12/2010 |
| WO | WO 2011/052094 | 5/2011 |
| WO | WO 2011/099793 | 8/2011 |
| WO | WO 2012/024499 | 2/2012 |
| WO | WO 2012/088442 | 6/2012 |
| WO | WO 2016/073575 | 5/2016 |

OTHER PUBLICATIONS

Office Action for European Application No. 13791074.1, dated Aug. 7, 2018, 5 pages.
Office Action for U.S. Appl. No. 14/932,153, dated Aug. 7, 2018, 6 pages.
Office Action for U.S. Appl. No. 14/932,153, dated Jan. 31, 2019, 7 pages.
Extended European Search Report for European Application No. 16812533.4, dated Nov. 19, 2018, 7 pages.
Office Action for U.S. Appl. No. 15/185,625, dated May 18, 2018, 9 pages.
Office Action for U.S. Appl. No. 13/607,021, dated Apr. 20, 2015, 8 pages.
Office Action for U.S. Appl. No. 13/607,021, dated Jul. 10, 2015, 4 pages.
International Search Report and Written Opinion for International Application No. PCT/US2012/054219, dated Feb. 21, 2013, 13 pages.
Notification of the First Office Action for Chinese Application No. 201280051582.5, dated Nov. 4, 2015, 19 pages.
Notification of the Second Office Action for Chinese Application No. 201280051582.5, dated Aug. 26, 2016, 7 pages.
Supplementary European Search Report for European Application No. 12830248.6, dated Mar. 6, 2015, 6 pages.
Office Action for European Application No. 12830248.6, dated Jan. 19, 2017, 5 pages.
Notice of Reasons for Rejection for Japanese Patent Application No. 2014-529905, dated Jun. 29, 2016, 9 pages.
Office Action for U.S. Appl. No. 13/606,986, dated Jan. 14, 2016, 14 pages.
Office Action for U.S. Appl. No. 13/606,986, dated Jun. 3, 2016, 18 pages.
Office Action for U.S. Appl. No. 13/606,986, dated Jan. 26, 2017, 16 pages.
International Search Report and Written Opinion for International Application No. PCT/US2012/054218, dated Feb. 15, 2013, 10 pages.
Office Action for U.S. Appl. No. 13/832,836, dated Feb. 26, 2015, 9 pages.
Supplementary European Search Report for European Application No. 13791074.1, dated Mar. 31, 2016, 6 pages.
Notice of Reasons for Rejection for Japanese Application No. 2015-512878, dated Apr. 19, 2017, 7 pages.
Office Action for U.S. Appl. No. 14/543,489, dated Jul. 6, 2015, 9 pages.
Office Action for U.S. Appl. No. 14/543,489, dated Feb. 12, 2016, 7 pages.
International Search Report and Written Opinion for International Application No. PCT/US2013/041537, dated Oct. 10, 2013.
Office Action for U.S. Appl. No. 15/188,374, dated Apr. 12, 2017, 9 pages.
International Search Report and Written Opinion for International Application No. PCT/US2015/058992, dated Jan. 14, 2016, 10 pages.
Office Action for U.S. Appl. No. 15/185,625, dated Nov. 2, 2017, 11 pages.
International Search Report and Written Opinion for International Application No. PCT/US2016/038098, dated Oct. 31, 2016, 14 pages.
Armand, M. et al., "Conjugated dicarboxylate anodes for Li-ion batteries," Nature Materials, 8:120-125 (2009).
Bervas, M. et al., "Investigation of the Lithiation and Delithiation Conversion Mechanisms in a Bismuth Fluoride Nanocomposites," Journal of The Electrochemical Society, 153(4):A799-A808 (2006).
Chan, C. K. et al., "High-performance lithium battery anodes using silicon nanowires," Nature Nanotechnology, 3:31-35 (2008).
Duduta, M. et al., "Semi-Solid Lithium Rechargeable Flow Battery," Advanced Energy Materials. 1(4):511-516 (2011).
Li, H. et al., "Li-Storage via Heterogeneous Reaction in Selected Binary Metal Fluorides and Oxides," Journal of Electrochemical Society, 151(11):A1878-A1885 (2004).
Nakahara, K. et al. "Rechargeable batteries with organic radical cathodes," Chemical Physics Letters, 359:351-354 (2002).
Nishide, H. et al., "Organic radical battery: nitroxide polymers as a cathode-active material," Electrochimica Acta, 50:827-831 (2004).
Plitz, I. et al., "Structure and Electrochemistry of Carbon-Metal Fluoride Nanocomposites Fabricated by a Solid State Redox Conversion Reaction", Journal of The Electrochemical Society, 152(2):A307-A315 (2005).
Office Action for U.S. Appl. No. 14/926,760, dated Feb. 25, 2019, 9 pages.
Notice of Reasons for Rejection for Japanese Application No. 2015-512878, dated Mar. 29, 2019, 13 pages.
Notice of Reasons for Rejection for Japanese Application No. 2018-088757, dated Apr. 8, 2019, 9 pages.

(56) References Cited

OTHER PUBLICATIONS

First Office Action for Chinese Application No. 201580057914.4, dated Jul. 8, 2019, 17 pages.
Office Action for European Application No. 15794037.0, dated Jun. 4, 2019, 9 pages.
First Office Action for Chinese Application No. 201680004584.7, dated Feb. 3, 2019, 17 pages.
Substantive Examination Report (Restriction) for Philippines Patent Application No. 1-2017-500970, dated Mar. 14, 2019, 3 pages.
Notice of Reasons for Rejection for Japanese Application No. 2015-512878, dated Oct. 1, 2019, 6 pages.
Notice of Reasons for Rejection for Japanese Application No. 2018-088757, dated Oct. 2, 2019, 6 pages.

\* cited by examiner

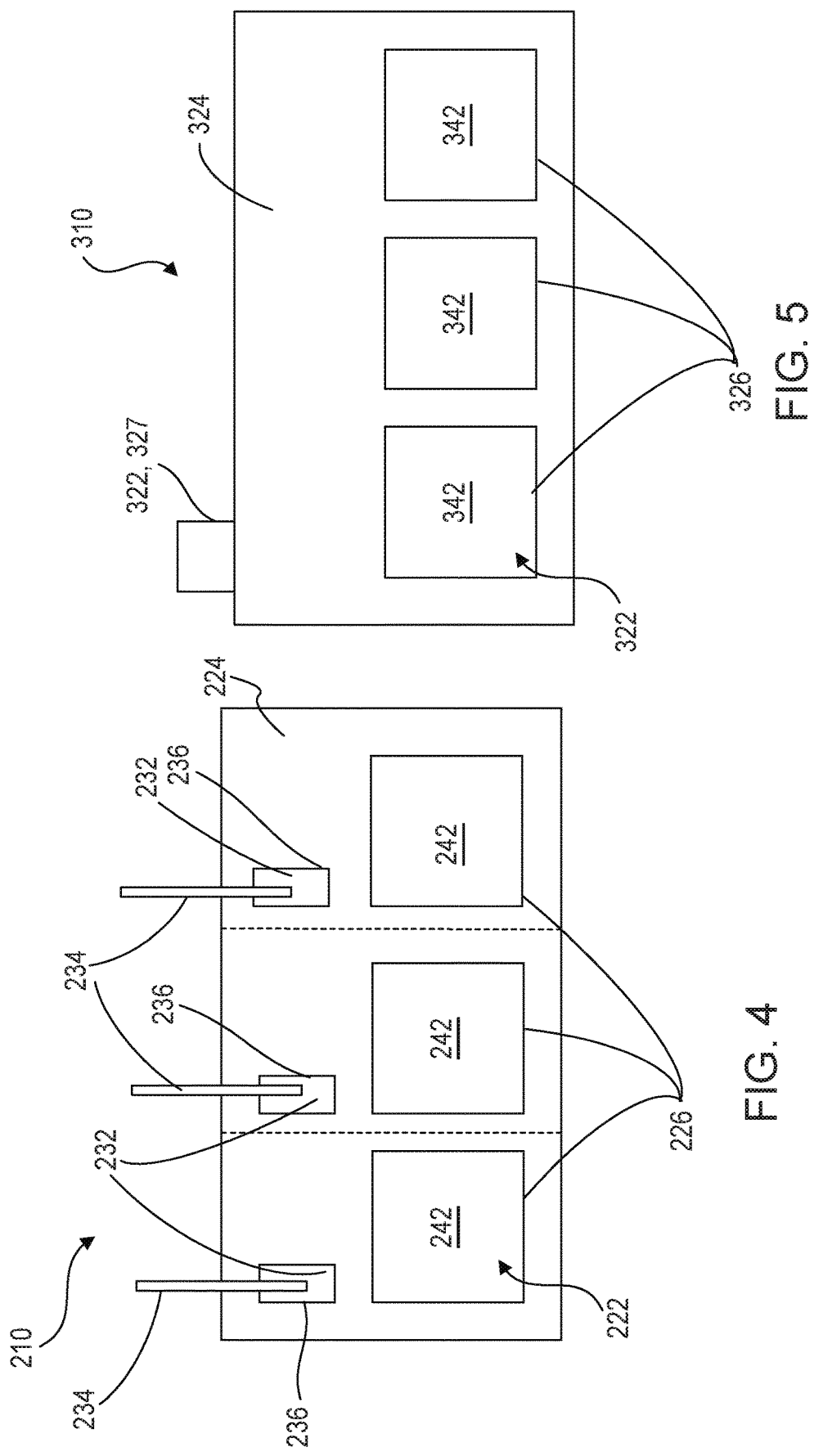

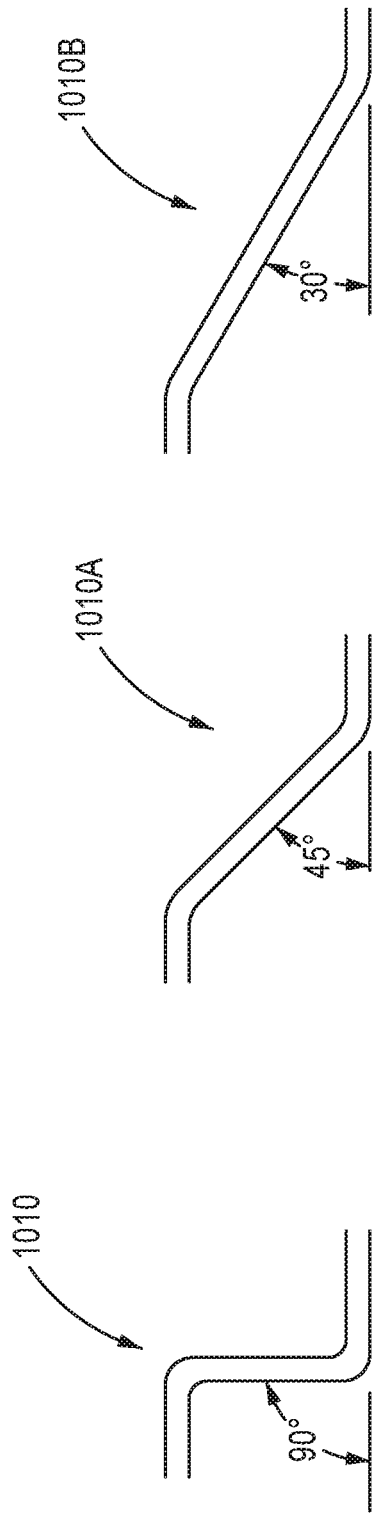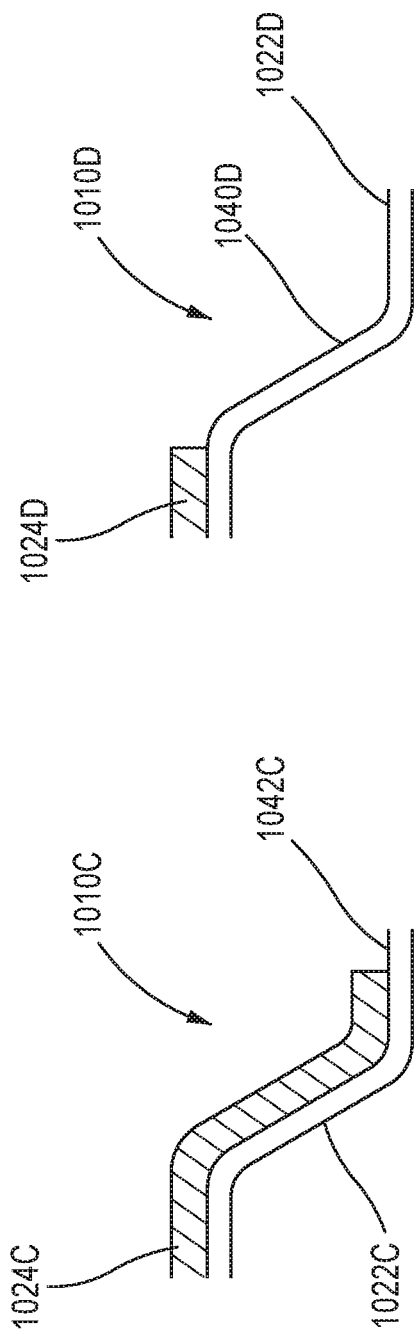

ELECTROCHEMICAL CELLS AND METHODS OF MANUFACTURING THE SAME

CROSS-REFERENCE TO RELATED APPLICATIONS

This application is a continuation of U.S. patent application Ser. No. 15/188,374, filed Jun. 21, 2016, now U.S. Pat. No. 9,812,674, entitled "Electrochemical Cells and Methods of Manufacturing the Same," which is a continuation of U.S. patent application Ser. No. 14/543,489, filed Nov. 17, 2014, now U.S. Pat. No. 9,401,501, entitled "Electrochemical Cells and Methods of Manufacturing the Same," which is a continuation of International Application Serial No. PCT/US 2013/041537, filed May 17, 2013, entitled "Electrochemical Cells and Methods of Manufacturing the Same," which is a continuation-in-part of and claims priority to U.S. patent application Ser. No. 13/832,836, filed Mar. 15, 2013, now U.S. Pat. No. 9,178,200, entitled "Electrochemical Cells and Methods of Manufacturing the Same," which claims priority to and the benefit of U.S. Provisional Application No. 61/648,967, filed May 18, 2012, entitled "Simplified Battery Design," each of which are hereby incorporated by reference in their entirety.

STATEMENT REGARDING FEDERALLY SPONSORED RESEARCH OR DEVELOPMENT

This invention was made with government support under Grant Number DE-AR0000102 awarded by the Department of Energy. The government has certain rights in the invention.

BACKGROUND

Embodiments described herein relate generally to an apparatus for use within an electrochemical cell that can be used as both an outer casing and a current collector for the electrochemical cell and methods for making such apparatus.

Some known electrochemical cells (e.g., batteries) can include a variety of shapes and/or sizes, can be based on a wide variety of enabling materials and internal architectures, can be either passive or actively controlled, can be rechargeable or not, and/or can share certain common features that can allow them to convert chemical energy to electrical energy. Some known batteries can include a first electrode having a high electrochemical potential and a second electrode having a lower electrochemical potential relative to the first electrode. Each electrode can include an active material that participates in a chemical reaction and/or physicochemical transformation during discharge by virtue of a favored thermodynamic change of material states, which can result in the flow of electrical current when a switch is closed. In some cases, for charge transfer to occur, two distinct conductive networks can allow the anode and cathode to be electrically connected. A separator can be used to provide isolation of the anode and cathode such that only ions are able to pass through it, and to prevent short circuiting.

The manufacture of battery electrodes can be a complex and capital intensive process, and can commonly include material mixing, casting, calendering, drying, slitting, and working (bending, rolling, etc.) according to the battery architecture being built. Because the electrode is manipulated during assembly, and to ensure conductive networks are in place, all components are compressed into a cohesive assembly, for example, by use of a binding agent. However, binding agents themselves occupy space, can add processing complexity, and can impede ionic and electronic conductivity.

Thus, there is a need for improvements in electrochemical cells (e.g., batteries) and the manufacture of electrochemical cells, such as eliminating components of the electrochemical cell and/or providing reduced packaging for the electrochemical cell, while maintaining the same energy storage capabilities.

SUMMARY

Electrochemical cells and methods of making electrochemical cells are described herein. In some embodiments, an apparatus includes a multi-layer sheet for encasing an electrode material of an electrochemical cell. The multi-layer sheet includes an outer layer, an intermediate layer that includes a conductive substrate, and an inner layer disposed on a portion of the conductive substrate. The intermediate layer being disposed between the outer layer and the inner layer. The inner layer defines an opening through which a conductive region of the intermediate layer is exposed such that the electrode material can be electrically connected to the conductive region and the intermediate layer can serve as a current collector for the electrochemical cell.

BRIEF DESCRIPTION OF THE DRAWINGS

FIG. 4 is a schematic top view of a portion of a laminate sheet for encasing an electrochemical cell, according to another embodiment.

FIG. 5 is a schematic top view of a portion of a laminate sheet for encasing an electrochemical cell, according to another embodiment.

FIGS. 13B-13D each illustrates a form angle for a laminate sheet for encasing an electrochemical cell, according to an embodiment.

FIGS. 13E and 13F each illustrate a portion of a laminate sheet for encasing an electrochemical cell, according to an embodiment.

DETAILED DESCRIPTION

Figure 1:
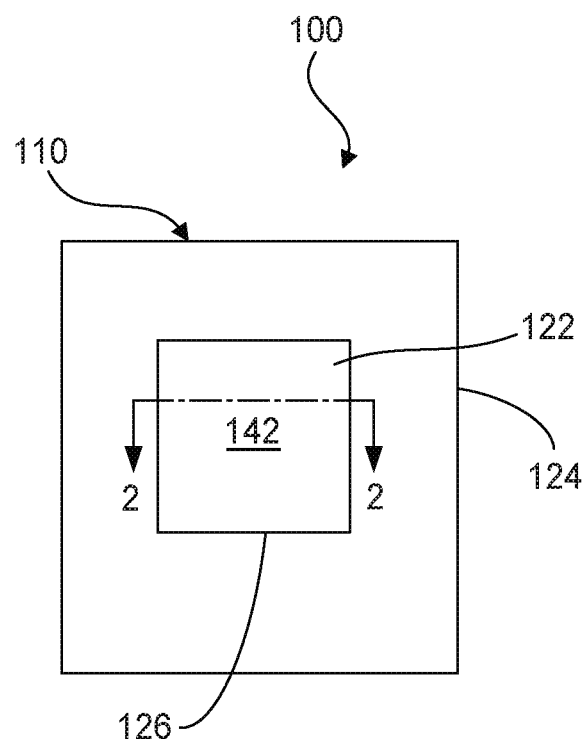
FIG. 1 is a schematic illustration of a laminate sheet for encasing an electrochemical cell, according to an embodiment.

Electrochemical cells, such as batteries, and methods of manufacturing electrochemical cells are described herein in which the "pouch" or "casing" of the electrochemical cell (also referred to as "cell") can also be used as an electrochemical functional component (e.g., the current collector) of the cell. As described herein, in some embodiments, a cell pouch (e.g., case) can include a laminated sheet formed with an outer layer, an intermediate metal foil layer and an inner layer. The inner layer can include openings to define a cavity in which an electrochemically active material of the electrode of the cell can be electrically connected with the metal foil member. Thus, in such an embodiment, the metal foil layer of the pouch can serve as the current collector of the cell.

In general, each electrode of an electrochemical cell can include active material(s), which can undergo chemical or physico-chemical change during discharge, and charge in the case of a secondary battery. The electrode can occupy/reside within a cavity of the electrochemical cell. The cavity can be defined as the volume of the cell that contains an electrode, and in some cases can contain additional volume to contain other components of the cell. Thus, in some embodiments, an electrode cavity can include several different regions.

For example, as described above, a cavity can refer to the entire volume of the cell in which an electrode is contained. In some embodiments, a cavity of a cell can include a fluid region, which can be the collective aggregated volume occupied by fluid suspension in the cavity, and which may or may not be continuous or homogeneous A cavity can also include an active region. The active region can be the collection of fluid substance in which active materials are or would be active (i.e., undergoing chemical or physico-chemical change) during charge/discharge, which may vary with operating conditions (e.g., temperature, state of charge, current, among others), in electrical contact with both a current collector and a separator.

The cavity may have zero, one, two, or more ports or openings to facilitate fluid exchange, and the ports may reside on any surface defining the cavity including, for example, a side surface and/or a rear surface. The ports may permit insertion and retraction of special equipment used during manufacture of the cell, or as feedthroughs for instrumentation, for example, during manufacture of the cell, or remaining resident after manufacturing is completed. A portion of the area of a cavity can be bounded by a current collector, and at least some of the area of the cavity can be bounded by a separator. Other portions of the cavity can be bounded by for example, frame seals, port plugs, an electrolytic substance, containment hardware, intra-cavity mechanical supports, instrumentation/sensors, and/or fluids.

The cavity geometry can be, for example, polygonal (rectangular, hexagonal, etc.), have rounded edges, or other shapes depending on the design objective. The cavity depth/thickness may be uniform, or can vary according to a shape profile. The cavity may only include an active region, or be partitioned into active and inactive regions. The cavity volume may be interrupted by members spanning the volume (for example across the thickness) e.g., for structural, fluid dynamic, or other reasons.

Some embodiments described herein relate to the fabrication and/or methods of manufacturing electrochemical cells, where the electrodes of the cell can contain an active material(s), electrolytic substance(s), and optionally other materials such as, for example, material participating in conductive networks (e.g., carbon powder or salts), rheology modifiers (e.g. dispersants, fluid stabilizers, and other functional agents). This is distinguished from conventional batteries in that the active materials are mobile (e.g., flowable) in the electrolytic substance (i.e. are not fixed in position relative to one another—at least during manufacturing, and optionally also (i) through a post-assembly period where other processing steps are undertaken, (ii) through a conditioning period of the assembled battery, (iii) throughout a fraction of the battery life, (iv) for the entire battery life cycle, or (v) for discontinuous periods throughout the battery life). The term "during manufacturing" in this context means the period of time from the first introduction of electrode substance or a material component thereof into the cavity region of the battery until the last introduction of electrode substance or a material component thereof into the cavity region. In some embodiments, a method of manufacturing a cell can include sealing, tabbing, and an overall simplified fabrication process.

As used in this specification, the singular forms "a," "an" and "the" include plural referents unless the context clearly dictates otherwise. Thus, for example, the term "a port" is intended to mean a single port or a combination of ports.

Electrode formulations can include, for example, (1) active materials (i.e., the sources and sinks of ions and electrons), (2) carbon (or a mixture of carbons) or other material(s) having the primary, but not necessarily exclusive, function of electronic conduction, and (3) an electrolyte (e.g., a solvent or solvent mixture plus salt(s)) having the primary, but not necessarily exclusive function of ionic conduction. The electrode formulation may optionally include other additives having specific intended chemical, mechanical, electrical, and/or thermal functions. Electrode formulations can include, for example, the active materials, compositions, and/or semi-solid suspensions described in U.S. Provisional Application No. 61/787,382, entitled "[Semi-Solid Electrodes Having High Rate Capability," and U.S. Provisional Application No. 61/787,372, entitled "Asymmetric Battery Having a Semi-Solid Cathode and High Energy Density Anode," the entire disclosures of which are hereby incorporated by reference.

Electrodes of a conventional electrochemical cell are typically prepared by coating a metal foil substrate with a thin (e.g., about 100 μm to about 200 μm) wet slurry that is subsequently dried and calendered to a desired thickness. The slurry components in this method are typically active materials, conductive additives, a binding agent, and a solvent (e.g., commonly N-Methylpyrrolidone (NMP)). When the solvent is evaporated (in a drying oven covering the conveying line), the binder converts to a "glue" that holds all of the solid particles together in a matrix bound to the substrate. It is common for electrodes to be coated with the same materials on both sides of the substrate. As used herein, the term "electrode material" can refer to the slurry described above.

There are two common battery design approaches, (1) wound, and (2) stacked. In wound battery designs, electrode sheets can be cut to target dimensions, and then, with a separator placed in between, wound into a spiral or jelly-roll, then infiltrated with electrolyte and suitably packaged (typically in a cylindrical or rectangular metal can) to afford containment and electrical connections. In stacked battery designs, electrode sheets can also be cut to target dimension, but can then be stacked on top of one another with separators placed in between, forming a cell composed of physically discrete, rather than continuous in the case of wound cells, anode/cathode pairs. The stacked assembly can then be infiltrated with electrolyte and commonly packaged in either a pouch/bag, a plastic box, or a metal can, which can each also be referred to as a cell or battery casing as described herein.

In conventional pouch packaging, the pouch can perform several functions. One such function is to provide a hermetic isolation of battery materials from the environment. Thus, the pouch can serve to avoid leakage of hazardous materials such as electrolyte solvents and/or corrosive salts to the ambient environment, and can prevent water and/or oxygen infiltration into the cell. Other functions of the pouch can include, for example, compressive packaging of the internal layers, voltage isolation for safety and handling, and mechanical protection of the battery assembly.

Typical pouch materials can include laminates (e.g., multi-layer sheets), formed into, for example, two or three solid film-like layers and bound together by adhesive. The word "laminate" as used herein can also refer to layers of material that are not chemically adhered to one another. For example, the layers can be in a real contact with each other and coupled using other coupling methods, such as, for example, heat sealing, UV and/or adhesives (e.g., anaerobic adhesives). The inner layer can be, for example, a plastic layer, such as, for example, a polyolefin (e.g., a cast polypropylene (CPP) or polyethylene). The next or second layer can be a metal foil layer, such as, for example, aluminum, aluminum alloy, copper, nickel, titanium, stainless steel, gold, platinum or carbon. In some pouch configurations, there can be an additional layer(s). The additional layer can be, for example, a protective coating, formed with, for example, a plastic, such as nylon. The metal foil can provide the function of hermeticity, being much less permeable to certain compounds, especially water, than plastics. The inner plastic layer can be thermally bondable to itself, which is the convention regarding pouch closure and admission of electrical pass-throughs. In pouch closure, if the inner layers (e.g. CPP) of two pieces of pouch laminate are brought into physical contact, and heat is applied, the layers will melt and fuse, creating a robust seal if the processing conditions (e.g., power, temperature, duration) are chosen appropriately. For example, when the sealing is done in a closed loop, an interior volume can be formed that is isolated from the ambient or exterior environment. For electrical pass-throughs, electrical tabs (e.g., strips of conductive metal containing a ring-like wrapping of a select plastic, such as, for example, Surlyn) can be attached to the internal battery assembly (e.g., by ultrasonic weld, clamping fixture, tape, etc) with the plastic ring aligned in the pouch so as to be also thermally sealable.

The tabbing approach described above can add manufacturing complexity and cost, and may require careful control with respect to quality during manufacture. For example, a polymer material is often used around the area where the electrical tabs pass through from the inside to the outside to the pouch for a better seal and to avoid leaks. Failure to control this aspect adequately can result in increased costs. The pouch laminates described above are known in the battery industry for use as packaging material, but not as an electrochemically functional component of the battery.

Systems, devices, and methods are described herein related to an electrochemical cell having a casing or pouch that includes multi-layer laminate sheets that include at least a first or inner layer formed with a plastic material and a second layer formed with an electronically conducting material such that the multi-layer sheet can be used as an electrochemically functional element of the cell. For example, in some embodiments, the electronically conducting material (e.g., metal foil) of a pouch can be used as a current collector for the cell. In some embodiments, the metal foil can be used as a pass-through tab. Thus, the multi-layer or laminate sheet(s) of the cell pouch can be used as an electrochemically functional material of the cell, in addition to acting as a packaging material.

Figure 2:
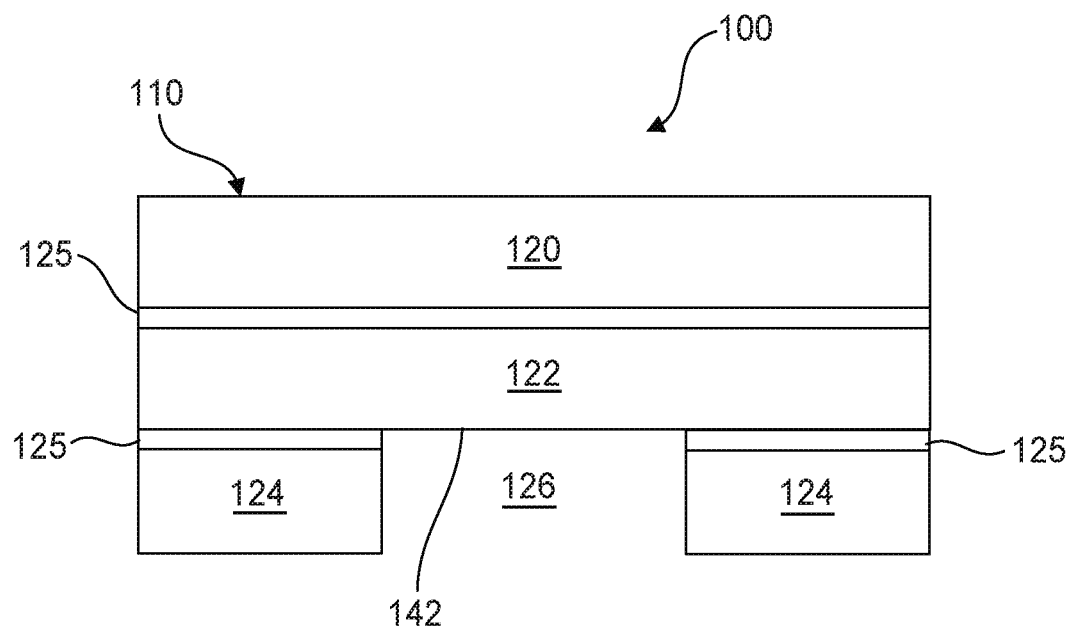
FIG. 2 is a cross-sectional view of the laminate sheet of FIG. 1 taken along line 2-2 in FIG. 1.
Figure 3:
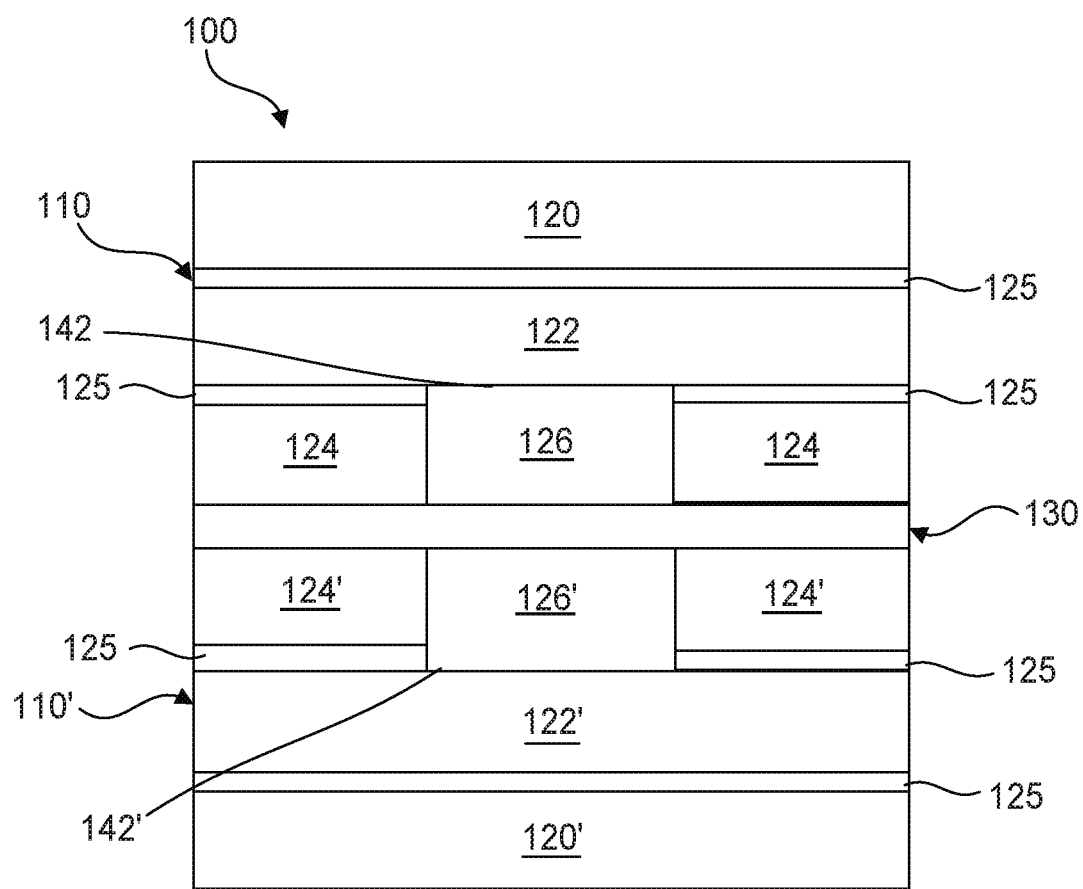
FIG. 3 is a cross-sectional view of a portion an electrochemical cell, according to an embodiment.

FIGS. 1-3 illustrate a portion of an electrochemical cell (also referred to herein as "energy storage device"), according to an embodiment. An electrochemical cell (e.g., a battery) can include a casing that includes two laminate or multi-layer sheets (also referred to herein as "laminate sheet" or "sheet") coupled together to encase an electrode material of the cell. As shown in FIGS. 1 and 2, a casing 100 (also referred to as a "pouch") can include a laminate sheet 110. The laminate sheet 110 can include a first or inner layer 124, a second or intermediate layer 122 and optionally a third or outer layer 120. As shown in FIG. 2, the second layer 122 can be coupled to the third layer 120 and coupled to the first layer 124 with an adhesive 125. In alternative embodiments, the third layer 120, second layer 122 and first layer 124 can be coupled by other methods. For example, the third layer 120, second layer 122, and first layer 124 can be disposed in a stacked relation and then heat sealed, for example, around a periphery of the layers. In some embodiments, the first layer 124 and/or the third layer 120 can be molded onto the second layer. In some embodiments, the first layer 124 and/or the third layer 120 can be spread or coated onto the second layer.

The third layer 120 can be formed with, for example, a polyamide (e.g., Nylon) and can have a thickness, for example, of about 0.025 mm. The second layer 122 can be formed with an electronically conductive material, such as, for example, aluminum, an aluminum alloy, or copper, and can have a thickness, for example, between about 0.025 mm and 0.040 mm. The first layer 124 can be formed with, for example, a material that is thermally bondable to itself. For example, the first layer 124 can be formed with a polypropylene (CPP). The first layer 124 can have a thickness of, for example, 0.040 mm.

In some embodiments, the first layer 124 can define one or more openings 126 such that a portion 142 of the second layer 122 is exposed through the opening 126, as shown in FIG. 1. With the portion 142 of the second layer 122 exposed, an electrochemically active material of the electrode (also referred to as "electrode material") can be in contact with and electrically connected to the second layer 122, as described in more detail below. Thus, the second layer 122 can serve as the current collector for the cell. The opening(s) 126 can be formed, for example, by laser ablation, die cutting, or a cavity can be formed or molded into the first layer 124.

As shown in FIG. 3, the casing 100 for an electrochemical cell can include two laminate sheets 110, 110' coupled together, with for example, adhesive, heat sealing or other suitable coupling methods to form a hermetic seal. The laminate sheet 110' shown in FIG. 3 can be formed the same as or similar to the laminate sheet 110. For example, the laminate sheet 110' can include an inner layer 124', an intermediate layer 122' and an outer layer 120' each coupled together with an adhesive 125. A first electrode material (not shown) can be disposed on the exposed portion 142 of the second layer 122, and a second electrode material (not shown) can be disposed on an exposed portion 142' of the second layer 122'. For example, one of the cavities 126, 126' can include an anode electrode and be referred to as the anode cavity of the cell, and the other cavity 126, 126' can include a cathode electrode and be referred to as the cathode cavity of the cell.

A separator member 130 can be disposed between the laminate sheet 110 and the laminate sheet 110' as shown in FIG. 3. The separator 130 can be used to provide isolation of the anode and cathode portions of the cell such that only ions are able to pass through it, and to prevent short circuiting of the cell.

In some embodiments, the inner layer 124 of the laminate sheet 110 and the inner layer 124' of the laminate sheet 110' can include a periphery portion (not shown in FIG. 3) that extends beyond a periphery of the separator 130 such that the first layers 124, 124' can be joined to form a seal. In some embodiments, the inner layers 124, 124' are each formed with a material that is thermally bondable to itself (e.g., CPP as described above) such that when the two laminate sheets 110 and 110' are joined, the first layer 124 and the first layer 124' can be joined around their peripheries and thermally bond to each other to form a hermetic seal.

In some embodiments, the cell can include integrated electrical tabbing, which can obviate the need for (i) a discrete tab component (e.g., an electrical lead), (ii) connecting dedicated tabs to current collectors, and (iii) a dedicated tab sealing operation. Instead, as described herein, in some embodiments, an electrical tab or lead can be provided as an extension of the second layer (e.g., the current collector) of the laminate sheet (e.g., 122 of the laminate sheet 110). Thus, electrical pass-through can be achieved via the cell sealing.

FIG. 4 illustrates a portion of a laminate sheet 210 that can be cut along the dashed lines to form three separate laminate sheets each for use within a casing of an electrochemical cell. As shown in FIG. 4, the laminate sheet 210 can include a first or inner layer 224, a second or intermediate layer 222 and can optionally include a third or outer protective layer (not shown in FIG. 3). As described above for laminate sheet 110, the first layer 224 can be formed with a plastic material, such as, for example, a cast polypropylene, and can define one or more openings 226 to expose a portion 242 of the second layer 222. The second layer 222 can be formed with an electrically conductive material that can be electrically coupled to an electrode material (not shown) disposed on the portion 242 through the opening 226 such that the exposed portion 242 of the second layer 222 can be used as a current collector for the cell. The first layer 224 can also define openings 236 that expose additional portions 232 of the second layer 222. The exposed portions 232 of the second layer 222 can serve as a power connection tab and/or can be coupled to an electrical lead 234 that can be used to provide an electrical current to the cell, as shown in FIG. 4. For example, the electrical lead 234 can be welded, brazed, crimped, etc. onto the exposed portion 232.

In alternative embodiments, rather than the exposed portion 232 being defined by an opening 236 of the first layer 224, the exposed portion 232 can be integral with the exposed portion 242 of layer 232. For example, in some such embodiments, the exposed portion 232 can extend from the exposed portion 242 as an integral component, and the electrode material can be disposed onto the exposed portion 242 while masking the exposed portion 232. In some such embodiments, the electrode material can be spread onto the exposed portion 242 and exposed portion 232 and then the electrode material on exposed portion 232 can be scraped off or otherwise removed and the electrical lead 234 can be coupled to the exposed portion 232.

FIG. 5 illustrates a laminate sheet 310 according to another embodiment. In this embodiment, the laminate sheet 310 can include a first or inner layer 324, a second or intermediate layer 322 and a third or outer layer (not shown in FIG. 3). The first layer 324 can be formed with a plastic material such as, for example, a cast polypropylene, and can define one or more openings 326 to expose a portion of the second layer 322. As shown in FIG. 5, in this embodiment, there are three openings 326. The second layer 322 can be formed with an electrically conductive material that can be electrically coupled to an electrode material (not shown) disposed on the exposed portions 342 of the second layer 322 through the openings 326. In this embodiment, the second layer 322 includes an extended portion 327 that extends beyond a peripheral edge of the inner layer 324. The extended portion 327 can function as a power connection tab to provide electrical current to the electrode material disposed on the exposed portion 342 of second layer 222.

Figure 6:
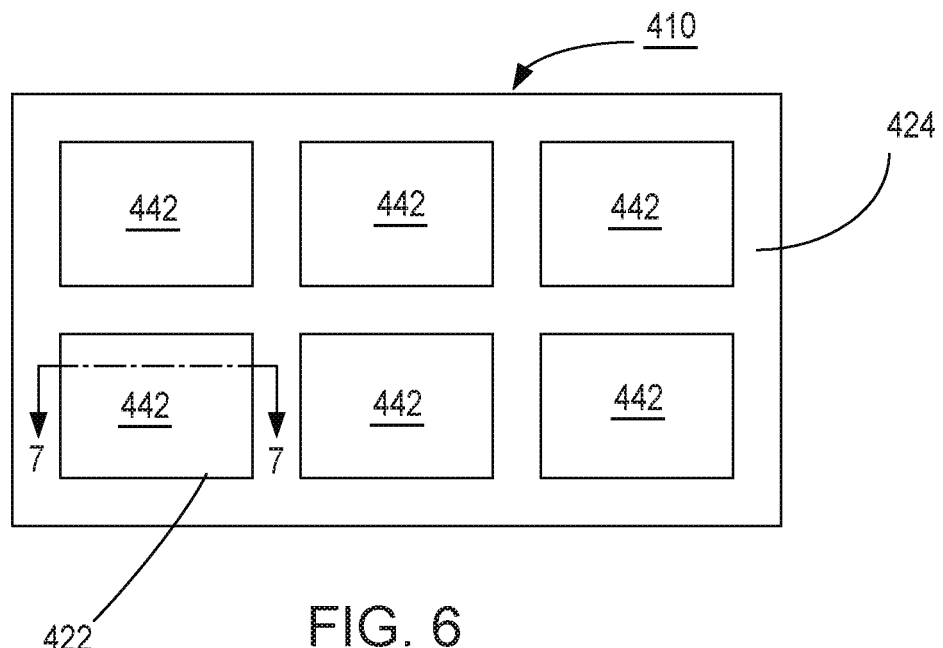
FIG. 6 is a schematic top view of a portion of a laminate sheet for encasing an electrochemical cell, according to another embodiment.
Figure 7:
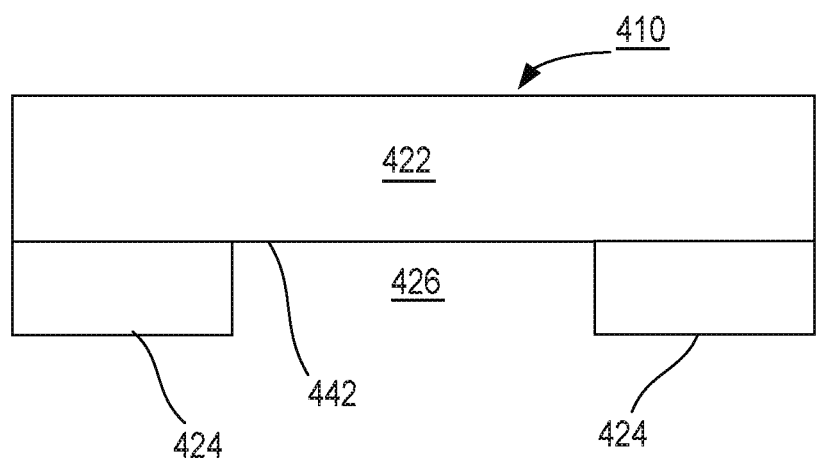
FIG. 7 is a cross-section view of the portion of a laminate sheet of FIG. 6 taken along line 7-7 in FIG. 6.

FIGS. 6 and 7 illustrate another embodiment of a laminate sheet that can be used within a casing for an electrochemical cell and can also be used as the current collector for the cell. A laminate sheet 410 includes a first layer 424 and a second layer 422. The first layer 424 can be coupled to the second layer 422 with, for example, an adhesive, with heat sealing or other known coupling methods. The second layer 422 can be formed with an electrically conductive material such as, for example, an aluminum or copper material, and the first layer 424 can be formed with, for example, cast polypropylene (CPP) as described above for previous embodiments. In this embodiment, without a third or outer protective layer, it may be desirable for the second layer 422 to have a greater thickness than embodiments that have a third layer. For example, it may be desirable for the second layer 422 to have a thickness between about 0.075 and 0.100 mm.

The first layer 424 defines openings 426 such that portions 442 of the conductive second layer 422 are exposed through the openings 426, as shown in FIG. 6. The exposed portions 442 of the second layer 422 can be electrically connected to an electrochemically active material of an electrode disposed on the second layer 422 within the openings 426. Thus, the second layer 422 can serve as the current collector for the cell. As described above, the openings 426 can be formed, for example, by laser ablation or die cutting.

In some embodiments, a laminate sheet as described herein for use as a casing for an electrochemical cell and also as a current conductor for the cell can include a cavity or opening that is formed or molded into the laminate sheet. Such a cell having a formed laminate sheet(s) can be referred to as a "formed cell." Such laminate sheets can be referred to as "formed laminate sheets." Such formed laminate sheets can be formed such that at least a portion of the second layer (e.g., metal foil) is formed with a permanent deformation. The deformation can form a cavity within the laminate sheet in which an electrode material of the cell can be disposed. In some embodiments, an upper peripheral surface of the metal foil (e.g., second layer) on which an inner plastic layer is disposed may not be formed. In other words, an upper ledge can be maintained on which the inner layer can at least be disposed. In other embodiments, the inner layer can be disposed on at least a portion of a side wall of the formed cavity region. In some embodiments, the inner layer can be disposed on a portion of the lower surface defining the cavity region of the formed laminate sheet.

The wall and bottom surface of the formed cavity region of the laminate sheet can have relatively uniform thickness or the thickness can vary. The side wall can be formed at various angles relative to the bottom surface defining the cavity. For example, the angle can be formed with an angle between 0 and 90 degrees. In some embodiments, the angle can vary, for example, around a periphery of the cavity region. In some embodiments, the bottom surface of the cavity region can include raised portions, such as, for example, a dimpled surface, a wavy surface, a protrusion, ridges, etc. that can provide structural reinforcement to the laminate sheet. The cavity region can have a variety of different shapes and sizes. For example, the cavity region can be a polygonal shape (e.g., square, hexagonal, etc.), circular, elliptical or other suitable shapes. In some embodiments, a cell casing can include a first laminate sheet that is a formed laminate sheet and a second laminate sheet that is not formed. In other words, the other side of the cell casing can include an inner layer that defines openings that are, for example, die cut or laser formed, as described above for previous embodiments.

Figure 8:
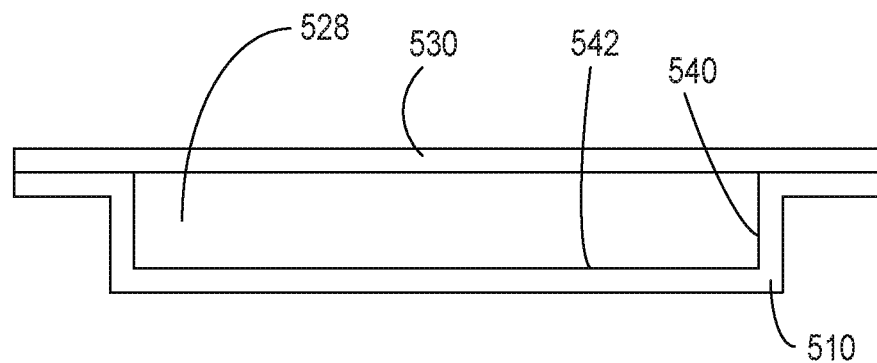
FIG. 8 is a cross-sectional view of a portion of an electrochemical cell, according to another embodiment.
Figure 9:
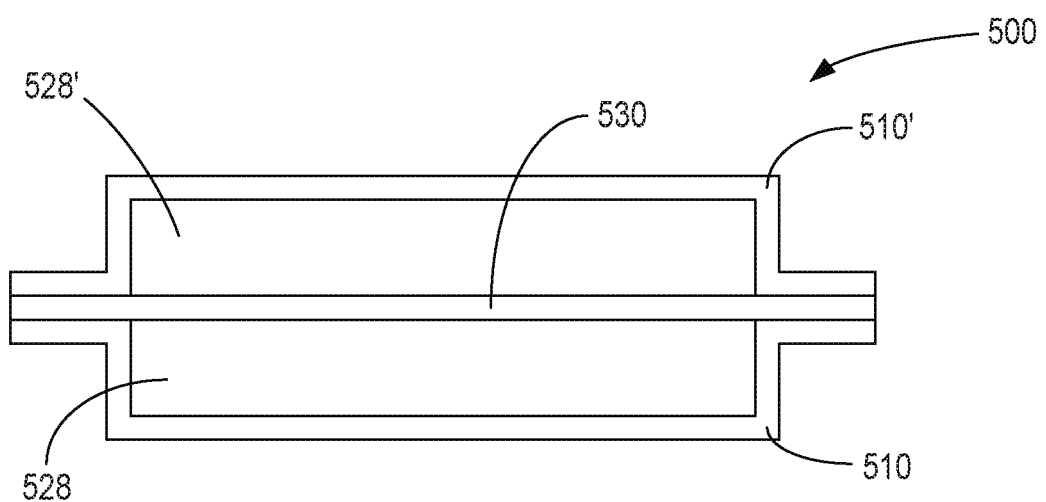
FIG. 9 is a cross-sectional view of another portion of the electrochemical cell of FIG. 8.

FIG. 8 illustrates a formed laminate sheet 510 that includes a first or inner layer, a second or intermediate layer and a third or outer layer (each not shown in FIG. 8). As described above for previous embodiments, the second layer can include a metal foil formed with an electrically conductive material, such as, for example, aluminum, an aluminum alloy, or copper. The first layer can define one or more openings (not shown) to expose at least a portion of the second layer. The formed laminate sheet 510 defines a cavity 528 in which an electrode material can be disposed and be electrically connected to the exposed conductive material of the second layer (e.g., metal foil). In this embodiment, the laminate sheet 510 includes walls 540 that are formed at a substantially 90 degree angle relative to a bottom surface 542 of the cavity 528. The bottom surface 542 can be the exposed surface of the second conductive layer. The walls 540 and bottom surface 542 define the cavity 528. A separator 530 is coupled to the laminate sheet 510 and encloses the cavity 528. The laminate sheet 510 can be coupled to a laminate sheet 510' on an opposite side of the separator 530 to form a cell pouch or casing 500, as shown in FIG. 9. The laminate sheet 510' can be formed the same or similar as described for laminate sheet 510 and can define a cavity 528'. An anode electrode material can be disposed in none of the cavities 528, 528' and a cathode electrode material can be disposed in the other of the cavities 528, 528'.

Figure 10:
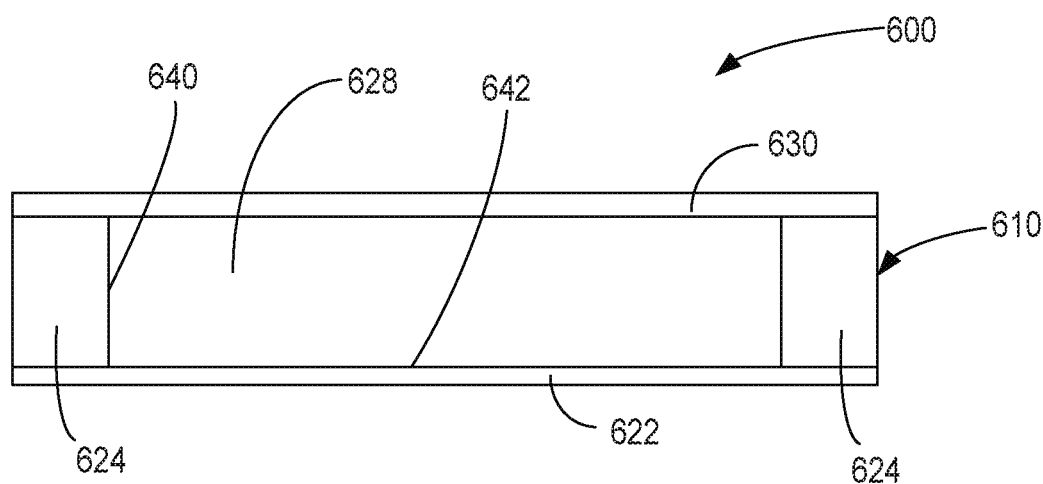
FIG. 10 is a cross-sectional view of a portion of an electrochemical cell, according to another embodiment.

FIG. 10 illustrates a portion of a framed cell casing 600. The cell casing 600 includes a laminate sheet 610 that includes a first layer 624 and a second layer 622, and a separator 630 is coupled to the first layer 624. A cavity 628 is defined by the side walls 640 of the first layer 624 and a surface 642 of the second layer 622. As with previous embodiments, the second layer 622 can be formed with an electrically conductive material, such as, for example, aluminum, an aluminum alloy, or copper. An electrode material (not shown) can be disposed within the cavity 628 and be electrically connected to the exposed conductive material of the second layer 622 (e.g., metal foil), such that the second layer 622 can serve as the current collector for the cell.

Figure 11:
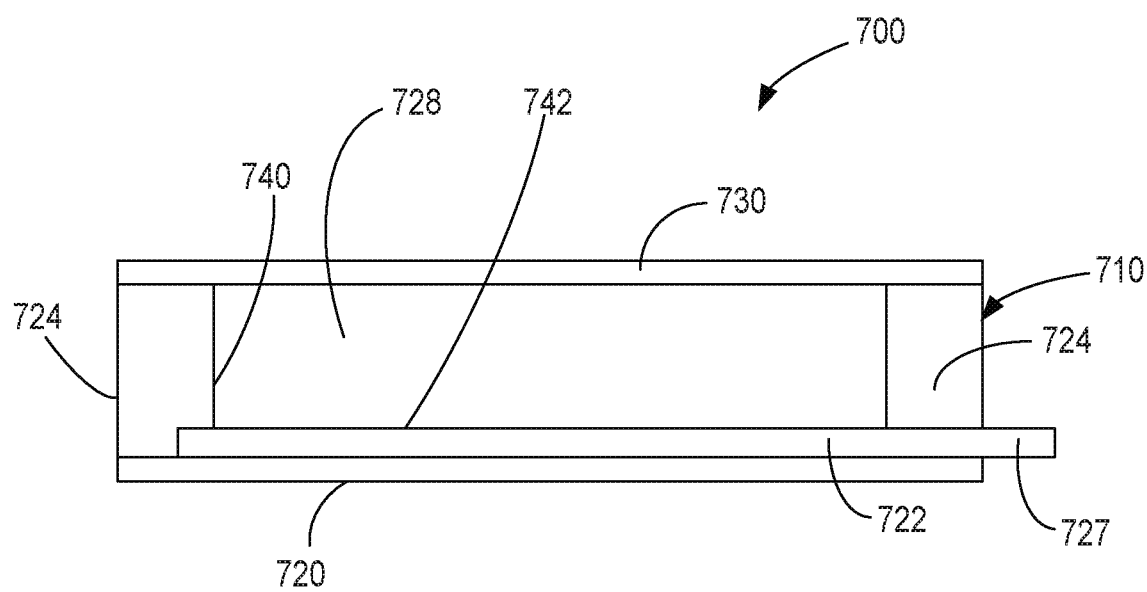
FIG. 11 is a cross-sectional view of a portion of an electrochemical cell, according to another embodiment.

FIG. 11 illustrates a portion of another framed cell casing 700. The cell casing 700 includes a laminate sheet 710 that includes a first layer 724, a second layer 722, and a separator 730 is coupled to the first layer 724. In this embodiment, a third layer 720 is also included. The third layer can be a plastic protective outer layer of the cell casing. A cavity 728 is defined by the side walls 740 of the first layer 724 and a surface 742 of the second layer 722. As with previous embodiments, the second layer 722 can be formed with an electrically conductive material, such as, for example, aluminum, an aluminum alloy, or copper. An electrode material (not shown) can be disposed within the cavity 728 and be electrically connected to the exposed conductive material of the second layer 722 (e.g., metal foil). The second layer 722 also includes a tab portion 727 that extends beyond an outer perimeter of the inner layer 724. The tab portion 727 can serve as a power connection tab to provide electrical current to the electrode.

Figure 12:
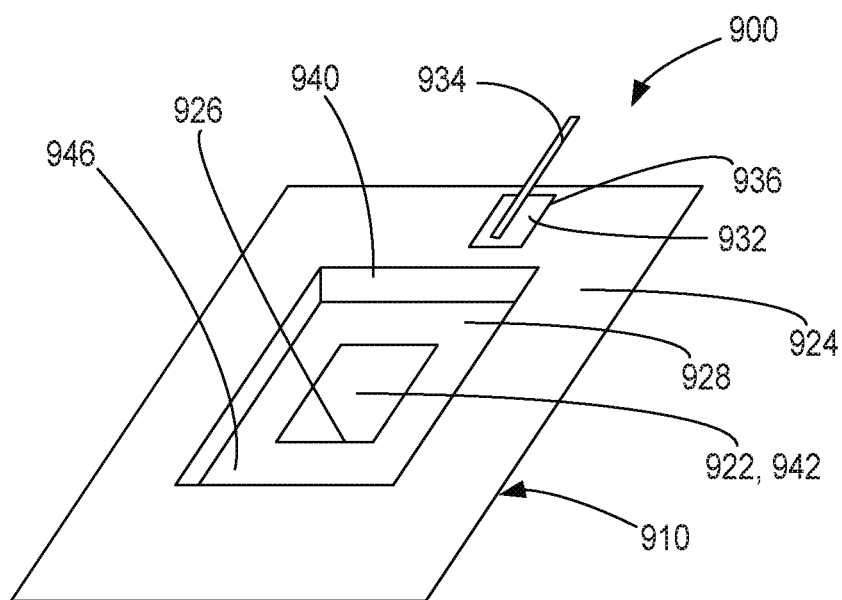
FIG. 12 is a perspective view of a portion of an electrochemical cell, according to another embodiment.

FIG. 12 illustrates another embodiment of a formed cell casing for an electrochemical cell. A cell casing 900 includes a formed laminate sheet 910 that includes a first layer 924 and a second layer 922. The laminate sheet 910 can also optionally include a third layer (not shown in FIG. 12). As described above for previous embodiments, the second layer 922 can be formed with an electrically conductive material, such as, for example, aluminum or an aluminum alloy. The first layer 924 defines a first opening 926 to expose at least a portion 942 of the second layer 922. The formed laminate sheet 910 defines a cavity 928 in which an electrode material can be disposed and be electrically connected to the exposed portion 942 of the second layer 922. In this embodiment, the laminate sheet 910 includes walls 940 that are formed at a substantially 90 degree angle relative to a bottom surface 946 of the first layer 924. The first layer 924 also defines the opening 926 at the periphery of the walls 940. The walls 940 and bottom surface 946 together with the exposed portion 942 of second layer 922 define the cavity 928. The first layer 924 also defines a second opening 936 that exposed a second portion 932 of the second layer 922. The second exposed portion 932 can serve as a power connection tab and be coupled to an electrical lead 934 that can be used to provide electrical current to the cell. As described for previous embodiments, a separator (not shown) can be coupled to the first layer 924 and a second laminate sheet (not shown) can be coupled to the separator and to the laminate sheet 910 to form the cell casing 900.

Figure 13A:
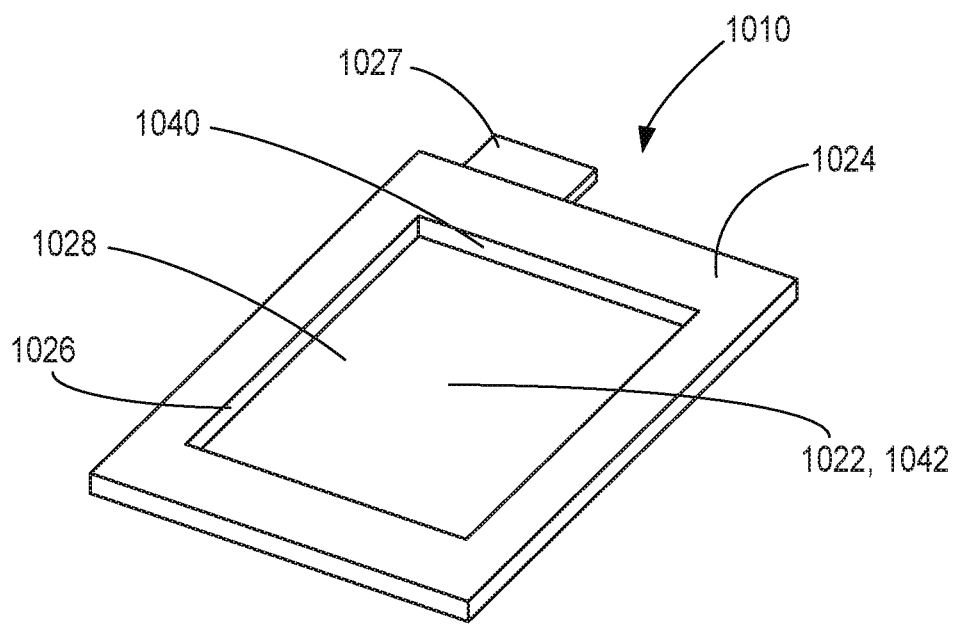
FIG. 13A is a perspective view of a portion of an electrochemical cell, according to another embodiment.

FIG. 13A illustrates a formed laminate sheet for a cell casing, according to another embodiment. A laminate sheet 1010 includes a first layer 1024 and a second layer 1022. The laminate sheet 1010 can also optionally include a third layer (not shown in FIG. 13A). As described above for previous embodiments, the second layer 1022 can be formed with an electrically conductive material, such as, for example, aluminum or an aluminum alloy. The first layer 1024 defines an opening 1026 to expose at least a surface portion 1042 of the second layer 1022. The formed laminate sheet 1010 defines a cavity 1028 in which an electrode material can be disposed and be electrically connected to the exposed portion 1042 of the second layer 1022. In this embodiment, the laminate sheet 1010 includes walls 1040 that are formed at a substantially 90 degree angle relative to the exposed surface portion 1042 of the second layer 1022. The walls 1040 and surface portion 1042 of second layer 1022 define the cavity 1028. In this embodiment, the second layer 1022 includes an extended portion 1027 that extends beyond an outer perimeter of the first layer 1024. The extended portion 1027 can serve as a power connection tab to provide electrical current to the cell. As described for previous embodiments, a separator (not shown) can be coupled to the first layer 1024 and a second laminate sheet (not shown) can be coupled to the separator and to the laminate sheet 1010 to form a cell casing.

FIG. 13B is an enlarged view of a portion of the laminate sheet 1010 illustrating the formed angle of 90 degrees between the walls 1040 and the surface 1042. FIGS. 13C and 13D each illustrate alternative embodiments of a laminate sheet 1010A and 1010B, respectively. As shown in FIG. 13C, the laminate sheet 1010A can be formed with a 45 degree angle, and as shown in FIG. 13D, the laminate sheet 1010B can be formed with a 30 degree angle. FIGS. 13E and 13F each illustrate alternative embodiments of a laminate sheet similar to laminate sheet 1010 with the first layer disposed on different portions of the second layer. In FIG. 13E, the laminate sheet 1010C illustrates an embodiment with a first layer 1024C extending onto a portion of the surface 1042C of the second layer 1022C. In FIG. 13F, the laminate sheet 1010D illustrates an embodiment with a first layer 1024D that does not cover the wall portions 1040D of the second layer 1022D.

Figure 14A:
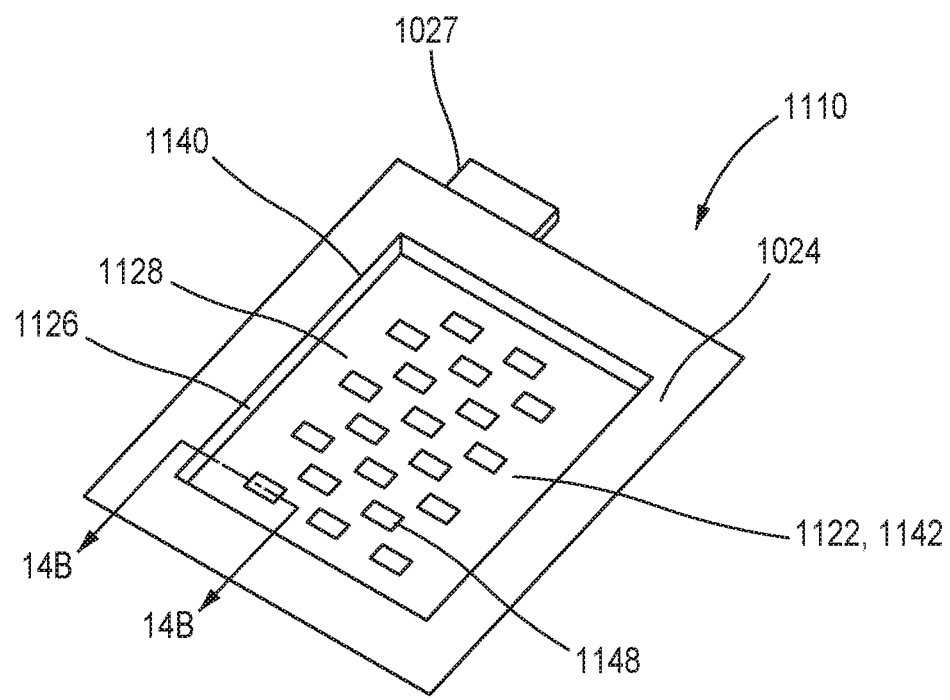
FIG. 14A is a perspective view of a portion of a laminate sheet for encasing an electrochemical cell, according to another embodiment.
Figure 14B:
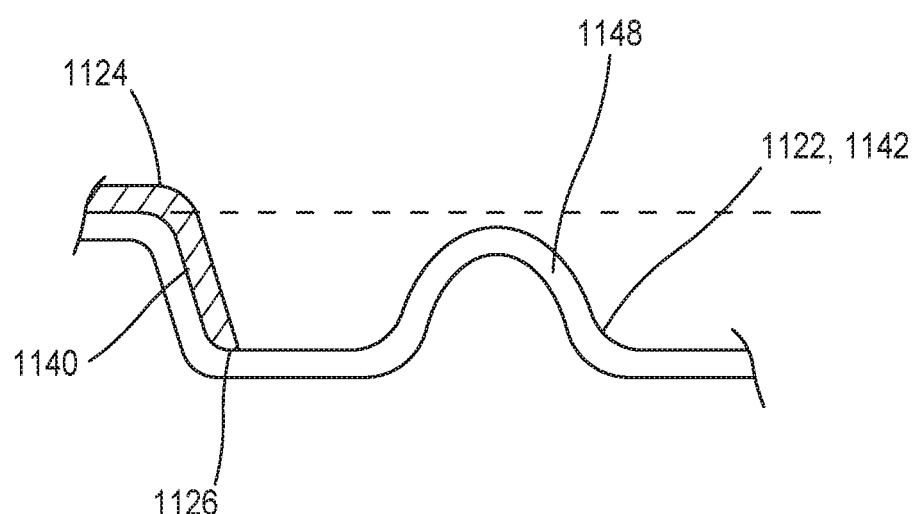
FIG. 14B is a cross-sectional view of the laminate sheet of FIG. 14A taken along line 14B-14B in FIG. 14A.

FIGS. 14A and 14B illustrate a formed laminate sheet for a cell casing, according to another embodiment that is similar to the embodiment of FIG. 14A. A laminate sheet 1110 includes a first layer 1124 and a second layer 1122, and can also optionally include a third layer (not shown in FIGS. 14A and 14B). As described above for previous embodiments, the second layer 1122 can be formed with an electrically conductive material, such as, for example, aluminum, an aluminum alloy, or copper. The first layer 1124 defines an opening 1126 to expose at least a portion of a surface 1142 of the second layer 1122. The formed laminate sheet 1110 defines a cavity 1128 in which an electrode material can be disposed and be electrically connected to the exposed surface portion 1142 of the second layer 1122. The laminate sheet 1110 includes walls 1140 that are formed at a substantially 90 degree angle relative to the surface 1142 of the second layer 1122. The walls 1140 and surface 1142 of second layer 1122 define the cavity 1128. In this embodiment, the second layer 1122 also includes raised portions (e.g., protrusions, dimples, etc.) 1148 that provide structural reinforcement to the laminate sheet 1110.

As with the embodiment of FIG. 13A, the second layer 1122 also includes an extended portion 1127 that extends beyond an outer perimeter of the first layer 1124. The extended portion 1127 can serve as a power connection tab to provide electrical current to the cell. As described for previous embodiments, a separator (not shown) can be coupled to the first layer 1124 and a second laminate sheet (not shown) can be coupled to the separator and to the laminate sheet 1110 to form a cell casing.

Figure 15A:
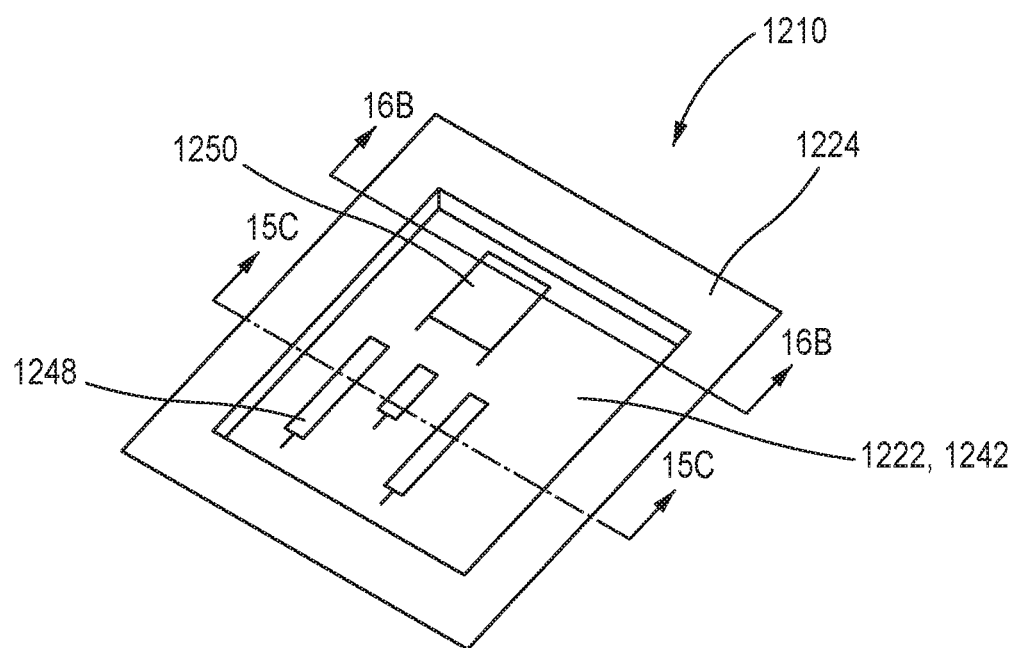
FIG. 15A is a perspective view of a portion of a laminate sheet for encasing an electrochemical cell, according to another embodiment.
Figure 15B:
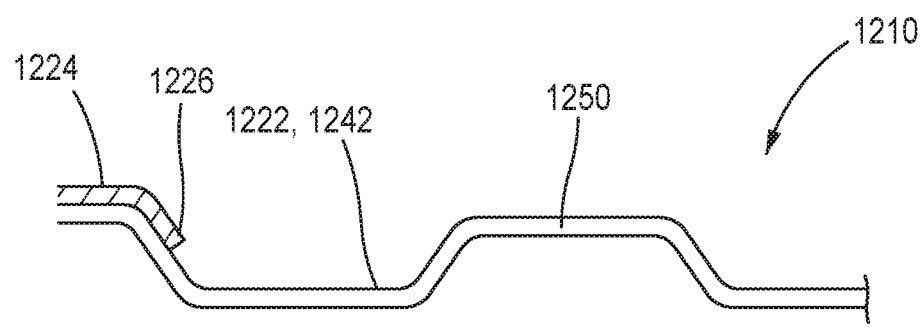
FIG. 15B is a cross-sectional view of the laminate sheet of FIG. 15A taken along line 15B-15B in FIG. 15A.
Figure 15C:
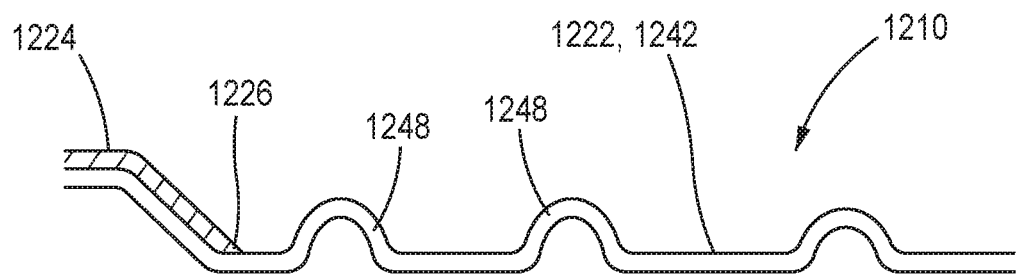
FIG. 15C is a cross-sectional view of the laminate sheet of FIG. 15A taken along line 15C-15C in FIG. 15A.

FIGS. 15A-15C illustrate another embodiment of formed laminate sheet for a cell casing that includes structural reinforcement features. A laminate sheet 1210 includes a first layer 1224 and a second layer 1222, and can also optionally include a third layer (not shown in FIGS. 16A-16C). As described above for previous embodiments, the second layer 1222 can be formed with an electrically conductive material, such as, for example, aluminum, an aluminum alloy, or copper. The first layer 1224 defines an opening 1226 to expose at least a portion of a surface 1242 of the second layer 1222. The formed laminate sheet 1210 defines a cavity 1228 in which an electrode material can be disposed and be electrically connected to the exposed portion of surface 1242 of the second layer 1222. In this embodiment, the laminate sheet 1210 includes walls 1240 that are formed at an angle less than 90 degrees relative to the surface 1242 of the second layer 1222, and the walls 1240 and surface 1242 of second layer 1222 define the cavity 1228. In this embodiment, the second layer 1222 also includes raised portions 1248 (e.g., protrusions, dimples, etc.) and a raised portion 1250 that provide structural reinforcement to the laminate sheet 1210.

Figure 16A:
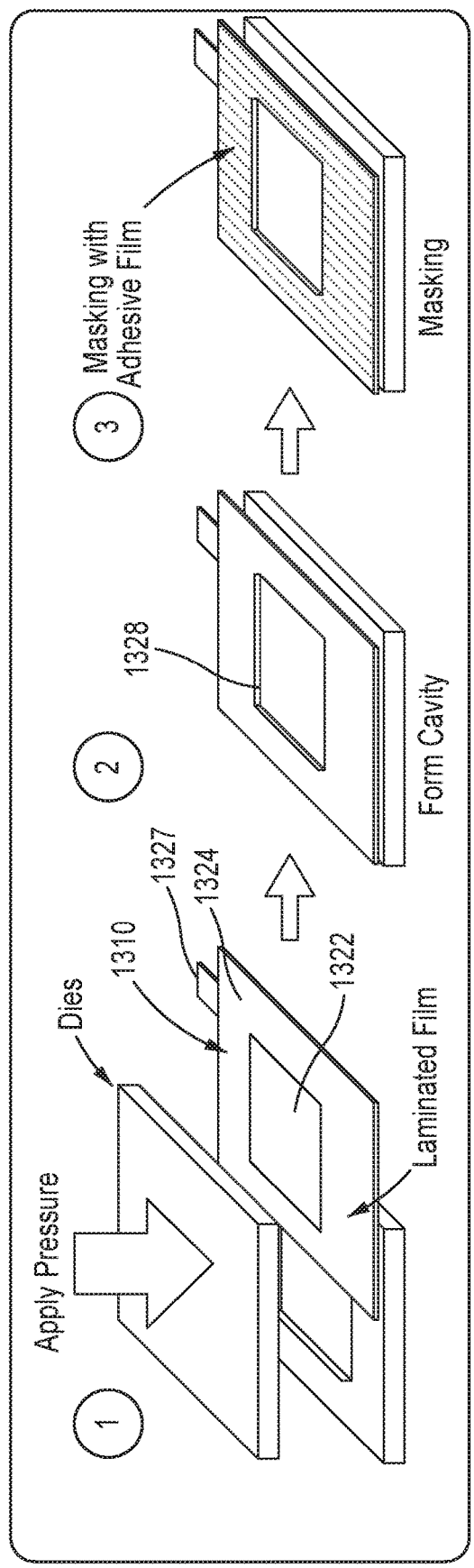
FIGS. 16A-16C illustrate steps of a process to manufacture an electrochemical cell, according to an embodiment.
Figure 16B:
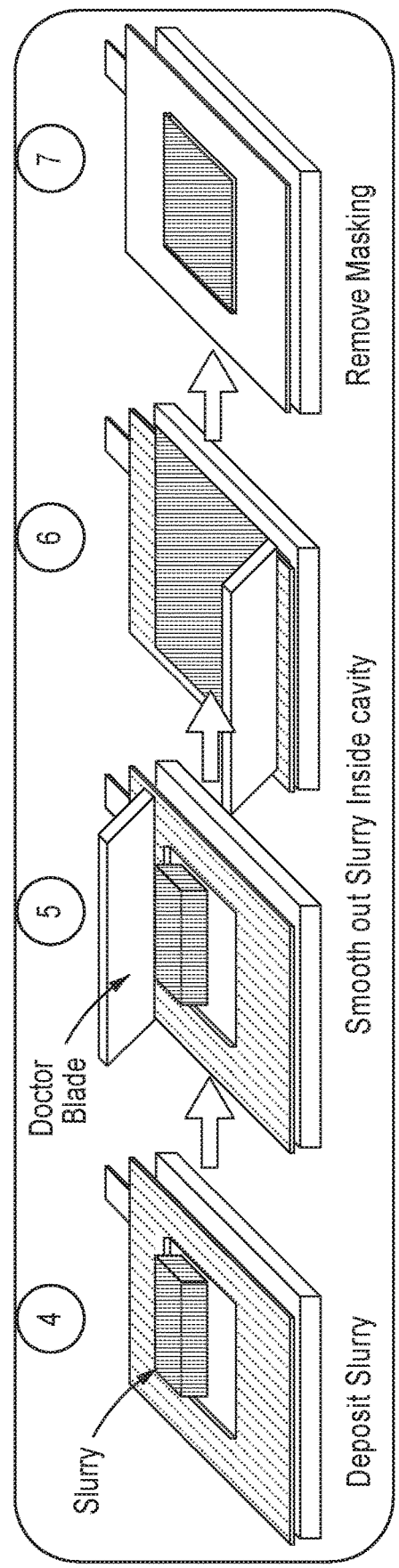
Figure 16C:
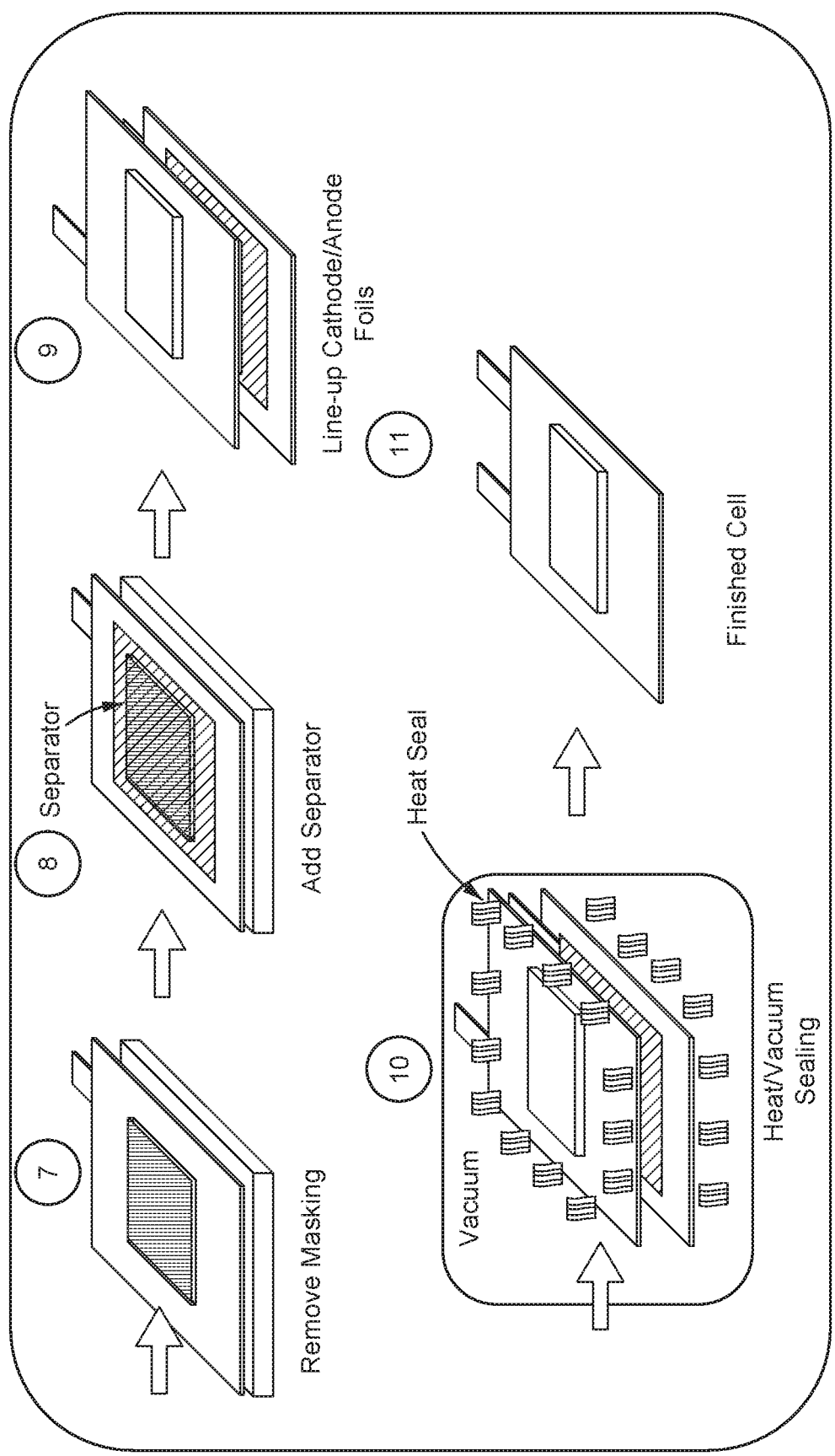

FIGS. 16A-16C illustrate various steps in a process of manufacturing an electrochemical cell having a laminate casing that can also function as the current collector for the cell. As shown in FIG. 16A, at step 1, a laminate sheet 1310 is placed within a die to form a cavity within the laminate sheet. The laminate sheet 1310 can include multiple layers as described above. For example, the laminate sheet 1310 includes a first layer 1324 that defines an opening through which a portion of a second layer 1322 is exposed. The laminate sheet 1310 can optionally include a third outer protective layer (not shown) as described herein. The second layer 1322 can be formed with an electrically conductive material and can be used as a current collector for the electrochemical cell. The second layer 1322 includes a power connection tab 1327 such as tabs 327 and 1027 described above. Step 2 illustrates the formed laminate sheet with a cavity 1328 defined therein in which an electrode can be disposed. At step 3, a masking material can be placed over the first layer such that only the exposed portion of the second layer is visible through the masking.

As shown in FIG. 16B, at step 4, an electrode (referred to as "slurry" in FIG. 16B) can be placed on the exposed portion of the second layer. At steps 5 and 6, the electrode can be smoothed or spread along the surface of the exposed portion of the second layer. For example, a blade or straight edged instrument can be used to spread the electrode. At step 7, the masking can be removed leaving only the portion of the electrode that has been spread onto the exposed portion of the second layer. As shown in FIG. 16C, at step 8, a separator can be placed on a portion of the first layer such that the separator is covering the electrode. At step 9, the completed laminate sheet and separator of step 8 can be joined with another such completed laminate sheet. For example, the electrode of the laminate sheet of step 8 can be a cathode electrode and the other laminate sheet can include an anode electrode. At step 10, a vacuum and heat seal process can be performed to seal the two laminate sheets together to form the finished cell as shown at step 11.

In conventional batteries, anodes of different layers (e.g., in wound or stacked configurations) can be electrically connected in parallel to one another, and the same for cathodes, which can dictate that the same media (anodic or cathodic) be on both sides of a single metal foil layer. Such configurations are generally described using single letter abbreviations: ACCAACC . . . AAC or the like where A=anode layer and C=cathode layer. The repeating of letters for internal layers refers to double coating configurations.

Figure 17B:
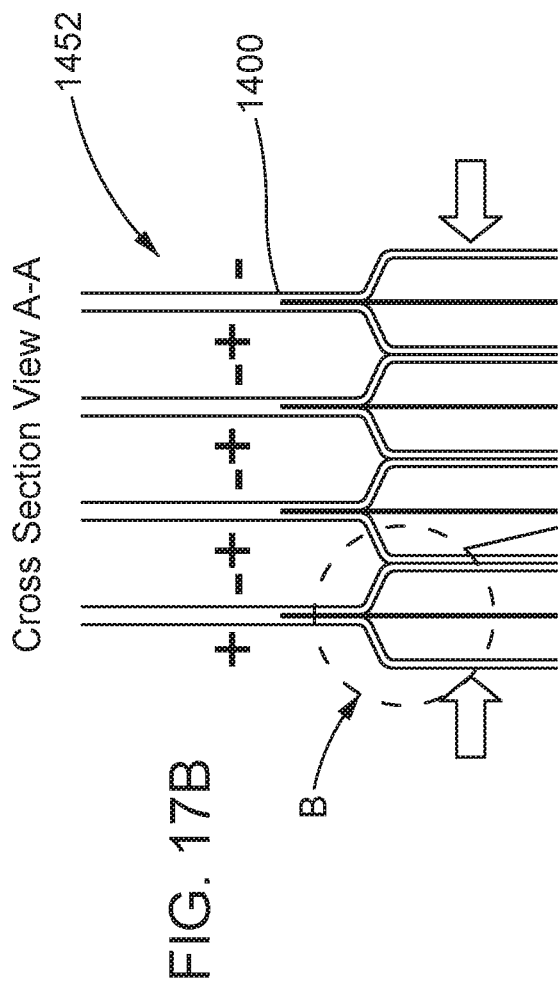
FIG. 17B is a cross-section view of the electrochemical cell of FIG. 17A taken along line 17B-17B in FIG. 17A.
Figure 17C:
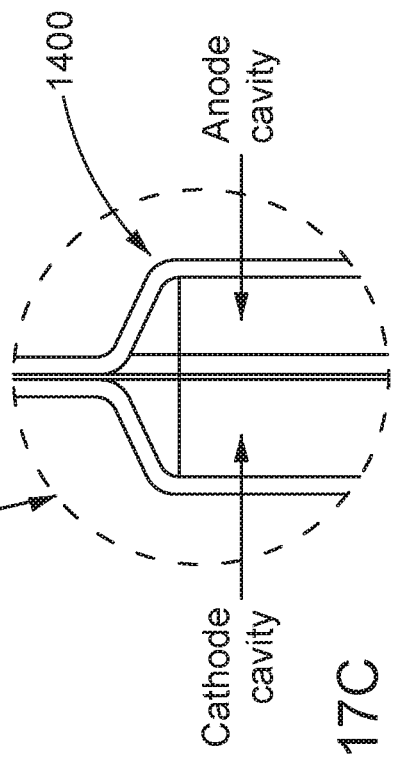
FIG. 17C is an enlarged view of a portion B of FIG. 17B.
Figure 17A:
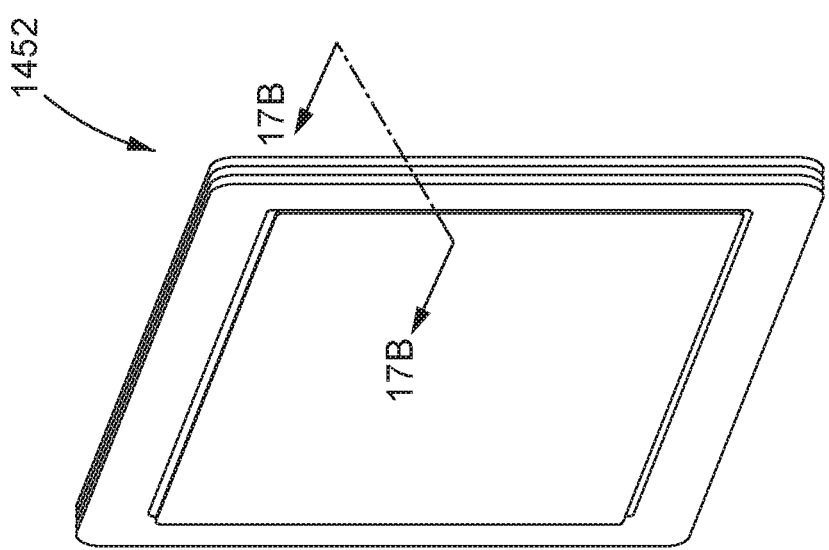
FIG. 17A is a perspective view of an electrochemical cell, according to another embodiment.

For two layer laminates described above for previous embodiments (e.g., a plastic layer disposed partially on a metal foil layer), in some such embodiments, the cell can be referred to a as bipolar battery or bipolar cell. FIG. 17A illustrates a bipolar cell 1452 that includes four electrochemical cells 1400. In such a bipolar cell, the exposed metal foil layer of one cell 1400 (e.g., an anode-cathode pair) can be disposed adjacent to that of a neighboring cell 1400, as shown in FIG. 17B. Electrical contact between adjacent foil layers can be realized by various methods, such as, for example, mechanical compression, use of an electrically conductive paste, welding, brazing, soldering, or other suitable technique. In such a bipolar stack, the stack voltage reflects the serial connection of all the cells composing it, and is thus substantially equal to the sum of the individual cell voltages.

Figure 18A:
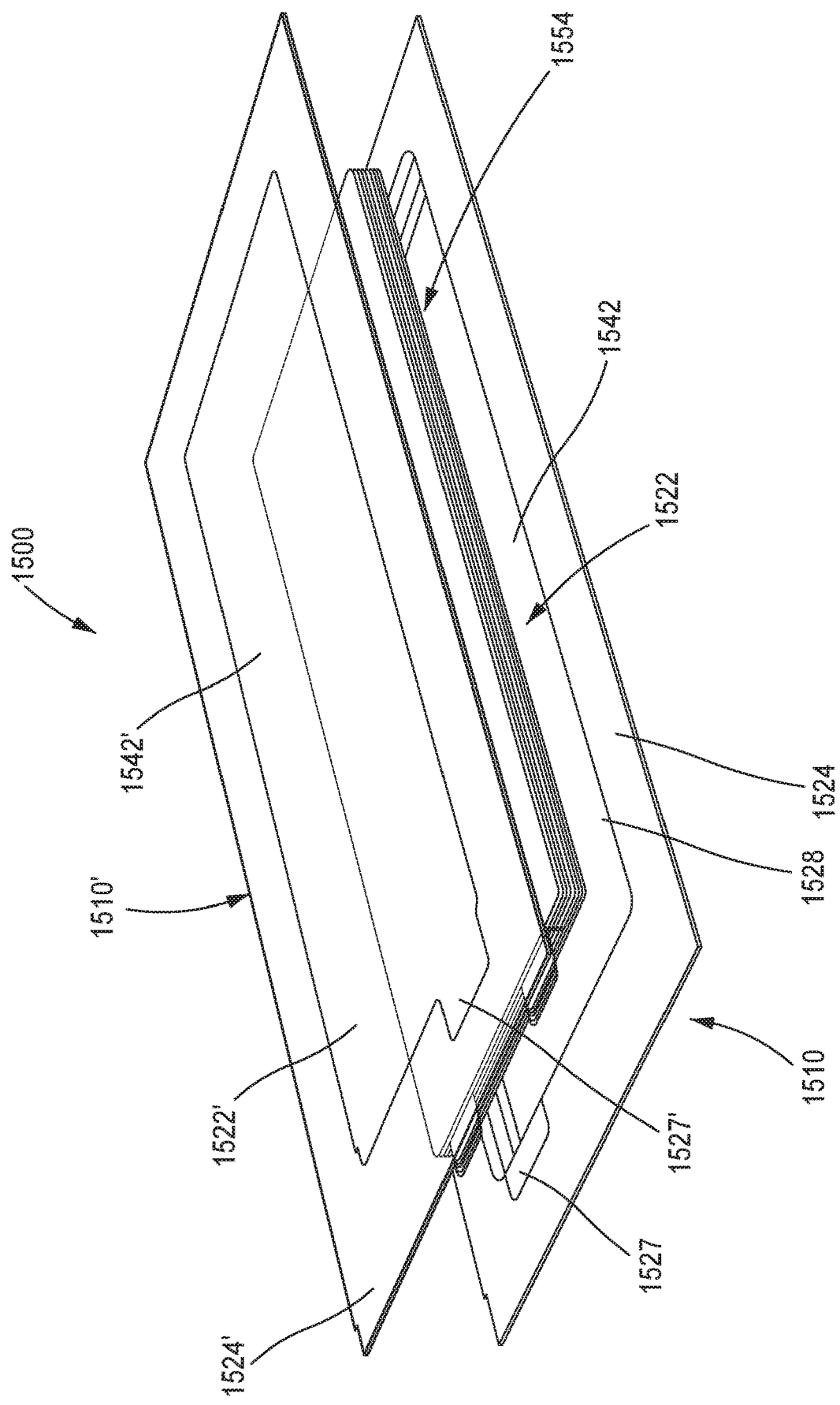
FIG. 18A is an exploded perspective with of an electrochemical cell, according to another embodiment, with a portion of the electrochemical cell shown transparent.
Figure 18B:
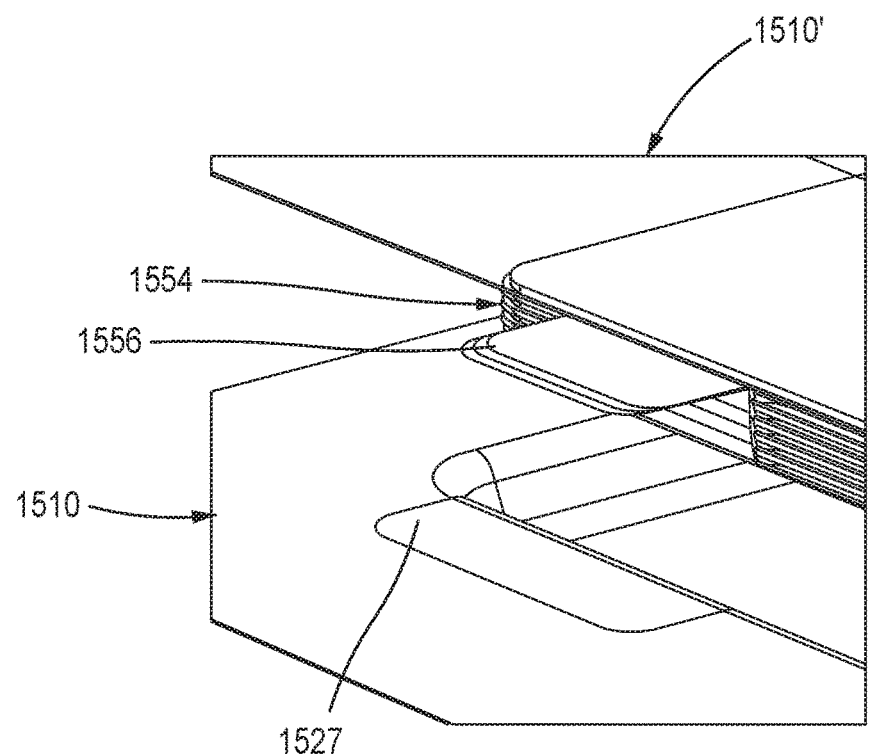
FIG. 18B is an enlarged view of a portion of the electrochemical cell of FIG. 18A.
Figure 18C:
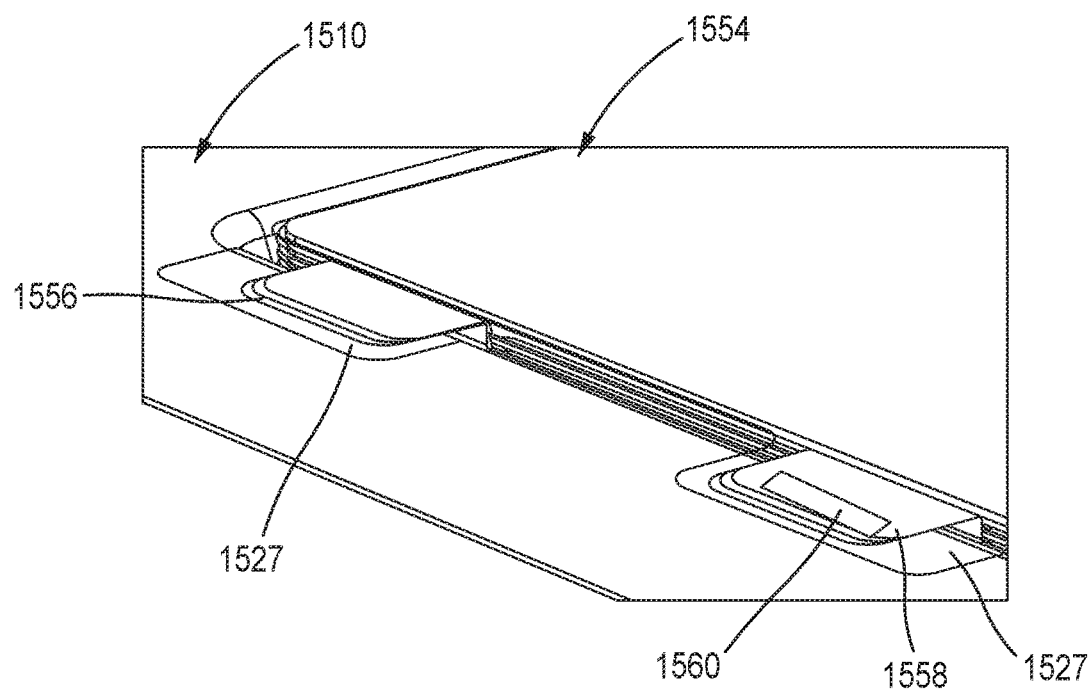
FIG. 18C is a perspective view of a portion of the electrochemical cell of FIG. 18A shown assembled.

FIGS. 18A-18C illustrate another embodiment of a formed cell casing for an electrochemical cell. A cell casing 1500 includes a formed laminate sheet 1510 and a formed laminate sheet 1510'. The laminate sheet 1510 includes a first layer 1524 coupled to a second layer 1522, and the laminate sheet 1510' includes a first layer 1524' coupled to a second layer 1522'. The first layers 1524, 1524' can be coupled to their respective second layers 1522, 1522' with, for example, an adhesive (not shown). The first layers 1524, 1524' can be formed with, for example, a cast polypropylene and the second layers 1522, 1522' can be formed with, for example, an aluminum or copper material. In this embodiment, without having a third protective layer, the second layers 1522, 1522' can be formed with a greater thickness, such as, for example, a thickness of 0.075 to 0.100 mm, and the first layer can have a thickness of for example, 0.040 mm. The first layer 1524' and second layer 1522' of the second laminate sheet 1510' are shown transparent in FIGS. 18A-18C for illustration purposes. As described above for previous embodiments, the second layers 1522, 1522' can each be formed with an electrically conductive material, such as, for example, aluminum or an aluminum alloy, or copper.

The first layers 1524, 1524' each define a cavity and an opening 1526, 1526' that exposes a portion 1542, 1542' of the respective second layers 1522, 1522'. The second layers 1522, 1522' each include the exposed portion 1542, 1542' that is exposed on both sides of first layer 1524, 1524', and an extended portion 1527, 1527' that is also exposed on both sides of first layer 1524, 1524'. The formed laminate sheet 1510 defines a cavity 1528 and the second laminate sheet 1510' also defines a cavity (not shown). The cavity 1528 and the cavity of the second laminate sheet 1510' collectively form an electrode cavity in which a stacked electrode 1554 can be disposed and be electrically connected to the exposed portion 1542 of second layer 1522 and the exposed portion 1542' of the second layer 1522'.

The stacked electrode 1554 can be a conventional electrode that includes multiple electrodes each including an electrode material disposed on a metal foil sheet and a pair of electrical connection tabs 1556 and 1558. The electrode stack 1554 can also include separators (not shown) disposed between the multiple electrodes. The tabs 1556 and 1558 can extend from the metal foil sheets and be welded to the laminate sheets 1510 and 1510'. As shown in FIG. 18C, the tab 1556 can be welded to the exposed portion 1527 of the laminate sheet 1510, and the tab 1558 can be welded to the exposed portion 1527' of the laminate sheet 1510' as shown at weld location 1560. In other words, as shown in FIG. 18C, the tab 1556 is welded on a bottom side to the top surface of the exposed portion 1527, and the tab 1558 is welded on an upper side to a surface of the exposed portion 1527'. The greater thickness of the second layers 1522, 1522' described above, can help facilitate welding of the tabs 1556 and 1558.

The laminate sheet 1510 and the laminate sheet 1510' can be coupled together with for example, a heat seal with the electrode stack 1554 disposed within the electrode cavity. With the tabs 1556 and 1558 weld to the exposed portions 1527 and 1527', respectively, the second layers 1522 and 1522' can serve as a power connection for the electrochemical cell 1500. Thus, the need for a pass-through electrical tab is eliminated.

In some embodiments, the electrode material can be cast into the open cavity of the cell using conventional coating, drying, and calendaring processes. The coatings can be continuous or discrete to accommodate wound, prismatic, or other cell geometries. In other embodiments, the inner layer and foil layer, the foil layer and outer layer (in the case of a three layer), or both, may not be chemically bonded by adhesive, rather, they can simply be in physical contact. Adjacent layers of laminates can be sealed and contact between them established using mechanical means, e.g. compressive force imposed by exterior plates, tie rods, or bands. In other embodiments, the laminate may be used only on the end cells of a stacked assembly. In yet another embodiment, the laminate cell design and assembly approach can be used on one of the anode or cathode sides instead of both.

In another embodiment, the laminate can be fabricated using conventional processes. For example, the foil substrate layer can be coated with electrode materials in a conventional manner (e.g., coated, dried, calendered), and optionally in discrete patches. A framing material can then be applied to the foil substrate to create a laminate. In this example, the electrode is not a slurry-based electrode; rather the electrode can be a conventional electrode (e.g., cast active material and conductive additive in a solid matrix held together with a binding agent, interspersed with electrolyte within its pores).

In some embodiments, the laminate current collectors of a cell as described herein can be configured to perform a heat exchange function, i.e. they can also function as heat collectors and dissipaters. In some applications, it may be desirable to maintain the cell operating temperature within a specified range (for example, −40 C to 60 C, or −20 C to 55 C, or 0 C to 55 C, or 15 C to 30 C), and it may be desirable that heat generated during cell operation be collected and conducted away from the active area of the cell to other regions of the cell, which may be at any location outside of the active area, where the heat can be dissipated. Regions of the foil layer can act as (1) cooling fins in the ambient environment, which may be air, a conditioned (e.g., temperature, humidity, etc.) gaseous environment, liquid coolant (e.g., water, water/glycol mixture, heat exchange fluid, etc.) conductive, (2) thermally conductive pathways affixed by suitable methods (e.g., chemical joining such as, e.g., welding, brazing, soldering, or physical contact, such as, e.g., compressive contact, crimping, co-folding) to auxiliary thermal management hardware and systems, or (3) radiant surfaces. Heat conduction in the opposite direction is also possible, for example, to facilitate an operational start or a start sequence from a cold condition (e.g. −100 C, −60 C, −40 C, −20 C, <0 C, or <15 C) in which case the current collecting portion of the laminate is used to conduct heat into the cell from another heat source.

In some embodiments, electrochemical cells as described herein can be connected in series and packaged with an inert gas. For example, multiple cells can be stacked in series and then placed into a housing (e.g., a can). The interior volume of the housing can then be purged with an inert gas and then hermetically sealed. As described herein, the laminate sheet provides a first seal for individual cells and the outer housing provides a second seal from the environment (e.g. zero moisture environments). Furthermore, the inert gas improves safety of the cell, battery and/or module by reducing or preventing sparks and fires.

While various embodiments have been described above, it should be understood that they have been presented by way of example only, not limitation, and various changes in form and details may be made. Where methods described above indicate certain events occurring in certain order, the ordering of certain events can be modified. Additionally, certain of the events can be performed concurrently in a parallel process when possible, as well as performed sequentially as described above. Any portion of the apparatus and/or methods described herein may be combined in any combination, except mutually exclusive combinations. The embodiments described herein can include various combinations and/or sub-combinations of the functions, components and/or features of the different embodiments described.

Furthermore, while certain temperatures, pressures, and other measurements, calculations, and/or other values are described in approximate terms, the values used are not meant to be exact and a range of values can be used. For example, while the formed cell of FIG. 8 is described as including 90 degree angles, in some embodiments, other angles can be used.

The invention claimed is:
1. An apparatus, comprising:
a first polymer sheet;
a first current collector disposed on the first polymer sheet;
a first semi-solid electrode material disposed on the first current collector;
a second polymer sheet;
a second current collector disposed on the second polymer sheet;
a second semi-solid electrode material disposed on the second current collector; and
a separator disposed between the first polymer sheet and the second polymer sheet, the separator extending beyond the first semi-solid electrode material and the second semi-solid electrode material and configured to isolate the first semi-solid electrode material from the second semi-solid electrode material.

2. The apparatus of claim 1, wherein the first current collector is coupled to the first polymer sheet and the second current collector is coupled to the second polymer sheet.

3. The apparatus of claim 1, wherein the first polymer sheet is thermally bondable to the second polymer sheet.

4. The apparatus of claim 1, wherein the separator is coupled to at least a portion of the first polymer sheet to form a seal around the first semi-solid electrode material.

5. The apparatus of claim 1, wherein the separator is coupled to at least a portion of the second polymer sheet to form a seal around the second semi-solid electrode material.

6. The apparatus of claim 1, wherein the first polymer sheet and the first current collector are layers of a first multi-layer laminate sheet, and the second polymer sheet and the second current collector are layers of a second multi-layer laminate sheet.

7. An apparatus, comprising:
a first pouch half having a first conductive region and a first sealing region;
a first semi-solid electrode material disposed on the first conductive region;
a second pouch half having a second conductive region and a second sealing region;
a second semi-solid electrode material disposed on the second conductive region; and
a separator disposed between the first pouch half and the second pouch half and extending beyond the first semi-solid electrode material and the second semi-solid electrode material, the first pouch half coupled to the second pouch half to form an electrochemical cell such that the separator is coupled to the first sealing region to encase the first electrode material and to the second sealing region to encase the second electrode material.

8. The apparatus of claim 7, wherein the first pouch half is thermally bondable to the second pouch half.

9. The apparatus of claim 7, wherein the first pouch half includes a polymer sheet and the first conductive region is disposed on the polymer sheet.

10. The apparatus of claim 7, wherein the first pouch half includes a polymer sheet and the first conductive region is coupled to the polymer sheet.

11. The apparatus of claims 7, wherein the first pouch half is a multi-layer laminate sheet.

12. The apparatus of claim 7, wherein the second pouch half includes a polymer sheet and the second conductive region is disposed on the polymer sheet.

13. The apparatus of claim 7, wherein the second pouch half includes a polymer sheet and the second conductive region is coupled to the polymer sheet.

14. The apparatus of claims 7, wherein the second pouch half is a multi-layer laminate sheet.

15. An apparatus, comprising:
a casing for an electrochemical cell, the casing including a first portion including a first conductive region and a first sealing region, and a second portion including a second conductive region and a second sealing region, the first sealing region and the second sealing region formed with a material configured to be thermally bondable to itself,
the first portion configured to define a first volume configured to receive a first semi-solid electrode material on the first conductive region,
the second portion configured to define a second volume configured to receive a second semi-solid electrode material on the second conductive region; and
a separator disposed between the first volume and the second volume and coupled to at least a portion of the first sealing region and the second sealing region, the separator extending beyond the first semi-solid electrode material and the second semi-solid electrode material.

16. The apparatus of claim 15, wherein the separator is coupled to at least a portion of the first sealing region to form a seal around the first volume.

17. The apparatus of claim 15, wherein the separator is coupled to at least a portion of the second sealing region to form a seal around the second volume.

18. The apparatus of claim 15, wherein at least one of the first portion and the second portion of the casing is a multi-layer laminate sheet.

19. The apparatus of claim 1, wherein the first current collector has a first side and a second side, wherein the first side is disposed on the first polymer sheet and the first semi-solid electrode material is disposed on the second side.

20. The apparatus of claim 1, wherein the second current collector has a first side and a second side, wherein the first side is disposed on the second polymer sheet and the second semi-solid electrode material is disposed on the second side.

21. The apparatus of claim 7, wherein the first conductive region has a first side and a second side, wherein the first side is coupled to the first sealing region and the second side is coupled to the first semi-solid electrode material.

22. The apparatus of claim 7, wherein the second conductive region has a first side and a second side, wherein the first side is coupled to the second sealing region and the second side is coupled to the second semi-solid electrode material.

23. The apparatus of claim 15, wherein the first conductive region has a first side and a second side, wherein the first side is coupled to the first sealing region and the second side is coupled to the first semi-solid electrode material.

24. The apparatus of claim 15, wherein the second conductive region has a first side and a second side, wherein the first side is coupled to the second sealing region and the second side is coupled to the second semi-solid electrode material.

* * * * *